US012246908B2

(12) United States Patent
Sparschuh

(10) Patent No.: US 12,246,908 B2
(45) Date of Patent: Mar. 11, 2025

(54) BUNDLE OF TUBULAR AND/OR ROD-SHAPED GLASS ARTICLES, METHOD FOR ITS FABRICATION AS WELL AS FOR UNPACKING SAID BUNDLE

(71) Applicant: SCHOTT AG, Mainz (DE)

(72) Inventor: Georg Helmut Sparschuh, Vadodara Gujarat (IN)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 18/338,535

(22) Filed: Jun. 21, 2023

(65) Prior Publication Data

US 2023/0331463 A1 Oct. 19, 2023

Related U.S. Application Data

(63) Continuation of application No. 17/190,313, filed on Mar. 2, 2021, now Pat. No. 11,724,872.

(30) Foreign Application Priority Data

Mar. 2, 2020 (EP) .................................. 20 160 473

(51) Int. Cl.
*B65D 85/20* (2006.01)
*A61J 1/06* (2006.01)
(Continued)

(52) U.S. Cl.
CPC .............. *B65D 85/20* (2013.01); *B65B 13/02* (2013.01); *B65D 63/10* (2013.01);
(Continued)

(58) Field of Classification Search
CPC .... B65D 85/20; B65D 63/10; B65D 71/0092; B65D 75/002; B65D 2571/00012; B65B 13/02; A61J 1/065
See application file for complete search history.

(56) References Cited

U.S. PATENT DOCUMENTS 2,059,390 A 11/1936 Pagel
2,284,616 A * 5/1942 Hedges ................ B61D 45/003 414/800

(Continued)

FOREIGN PATENT DOCUMENTS

CN 1122301 5/1996
CN 101905785 12/2010

(Continued)

OTHER PUBLICATIONS

DIN EN ISO 137, "Wool-Determination of fibre diameter—Projection microscope method", Sep. 2016, 19 Pages.

(Continued)

*Primary Examiner* — Lucas E. A. Palmer
(74) *Attorney, Agent, or Firm* — Ruggiero McAllister & McMahon LLC

(57) ABSTRACT

A bundle of tubular and/or rod-shaped glass articles is provided that includes a longest dimension, a plurality of layers ($N_L$) of the glass articles, and a thread-like element. The longest dimension extends in a first direction. The glass articles in each layer are arranged side by side in a second direction. The plurality of layers are arranged side by side in a third direction. The first, second, and third directions being perpendicular to one another. The thread-like element is around two of the glass articles in at least one layer so that the two glass articles are spaced apart.

22 Claims, 10 Drawing Sheets

(51) Int. Cl.
*B65B 13/02* (2006.01)
*B65D 63/10* (2006.01)
*B65D 71/00* (2006.01)
*B65D 75/00* (2006.01)

(52) U.S. Cl.
CPC ....... *B65D 71/0092* (2013.01); *B65D 75/002* (2013.01); *A61J 1/065* (2013.01); *B65D 2571/00012* (2013.01)

(56) References Cited

U.S. PATENT DOCUMENTS

| | | | | | |
|---|---|---|---|---|---|
| 2,350,752 | A | | 6/1944 | Graf | |
| 2,662,649 | A | * | 12/1953 | Gill | B65D 71/02 53/399 |
| 2,991,089 | A | * | 7/1961 | Stuart | B65D 71/02 206/443 |
| 3,143,266 | A | | 8/1964 | Imatake | |
| 3,263,830 | A | * | 8/1966 | Carl | B61D 45/003 414/800 |
| 3,294,225 | A | * | 12/1966 | Kenyon | B65D 81/113 206/820 |
| 3,373,540 | A | * | 3/1968 | Wisner | B65D 71/02 53/399 |
| 3,611,656 | A | * | 10/1971 | Chidsey, Jr. | B65D 71/50 206/145 |
| 3,710,535 | A | * | 1/1973 | Walter | B65B 17/025 53/558 |
| 3,802,987 | A | | 4/1974 | Noll | |
| 3,807,117 | A | * | 4/1974 | Abrams | B65B 21/245 53/553 |
| 4,090,002 | A | * | 5/1978 | Rosenblum | D03D 1/00 428/36.1 |
| 4,137,821 | A | * | 2/1979 | Benedict | F42B 39/087 198/803.15 |
| 4,385,696 | A | * | 5/1983 | Benedict | F42B 39/087 206/460 |
| 4,446,964 | A | * | 5/1984 | Moran | B65D 71/0096 206/443 |
| 4,546,950 | A | * | 10/1985 | Cech | F16F 1/46 381/361 |
| 4,693,167 | A | * | 9/1987 | Bagwell, Jr. | F42B 39/087 139/390 |
| 4,907,326 | A | | 3/1990 | Dietzel | |
| 5,294,222 | A | * | 3/1994 | Smith | B62D 33/0215 410/97 |
| D366,364 | S | * | 1/1996 | Pollock | D22/108 |
| 6,638,133 | B1 | | 10/2003 | Brancolino | |
| 6,915,619 | B2 | | 7/2005 | Baldwin | |
| 7,186,066 | B2 | * | 3/2007 | Bohac | B61D 45/00 410/35 |
| 11,352,197 | B2 | * | 6/2022 | Sparschuh | B65D 85/62 |
| 11,724,872 | B2 | * | 8/2023 | Sparschuh | B65D 81/05 206/443 |
| 11,873,158 | B2 | * | 1/2024 | Sparschuh | B65D 85/42 |
| 2006/0182614 | A1 | * | 8/2006 | Roesch | B65G 57/186 414/793 |
| 2008/0156681 | A1 | * | 7/2008 | Albrecht | B65D 75/004 206/446 |
| 2010/0199603 | A1 | * | 8/2010 | Daniel | A63C 11/025 53/399 |
| 2011/0089055 | A1 | | 4/2011 | Perl | |
| 2012/0326442 | A1 | * | 12/2012 | Crichton | B65B 27/10 289/2 |
| 2013/0240398 | A1 | | 9/2013 | Garner | |
| 2014/0196402 | A1 | | 7/2014 | Mader | |
| 2015/0014205 | A1 | | 1/2015 | Yap | |
| 2015/0267844 | A1 | * | 9/2015 | Zantout | B65D 63/1018 24/271 |
| 2016/0221736 | A1 | * | 8/2016 | Hayashi | B65D 57/003 |
| 2017/0174403 | A1 | * | 6/2017 | Feudner | B65D 85/62 |
| 2021/0269207 | A1 | * | 9/2021 | Sparschuh | B65B 69/0025 |

FOREIGN PATENT DOCUMENTS

| | | |
|---|---|---|
| CN | 102040044 | 5/2011 |
| CN | 103459280 | 12/2013 |
| CN | 103796933 | 5/2014 |
| CN | 103813969 | 5/2014 |
| CN | 105501705 | 4/2016 |
| CN | 206297920 | 7/2017 |
| DE | 82301 | 5/1971 |
| DE | 2262967 | 6/1974 |
| DE | 2729966 | 1/1979 |
| DE | 224555 | 7/1985 |
| DE | 4225876 | 2/1994 |
| DE | 20121582 | 2/2003 |
| EP | 0132587 | 2/1985 |
| FR | 2675776 | 10/1992 |
| JP | S50161394 | 12/1975 |
| JP | H0431230 | 2/1992 |
| JP | H09295686 | 11/1997 |
| JP | 10114382 | 5/1998 |
| NL | 1042016 | 3/2018 |
| WO | 2015037361 | 3/2015 |

OTHER PUBLICATIONS

ISO 6939, "Textiles—Yarns from packages—Method of test for breaking strength of yarn by the skein method", Second Edition, Oct. 15, 1988, 8 pages.

* cited by examiner

FIG. 1
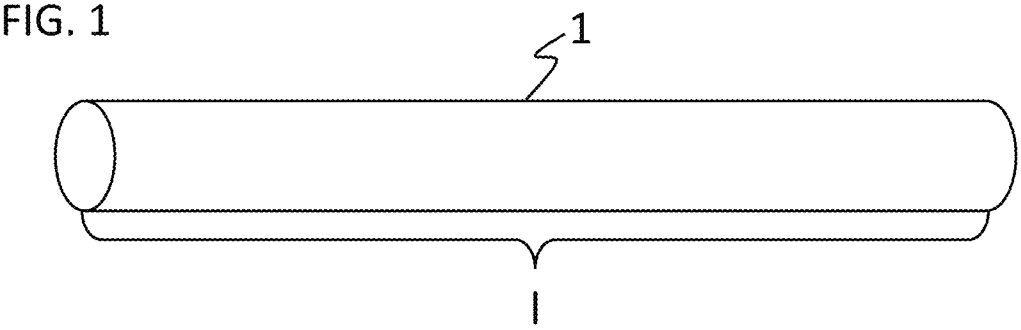
FIG. 2a
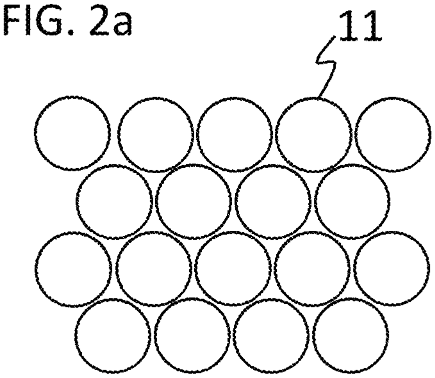
FIG. 2b
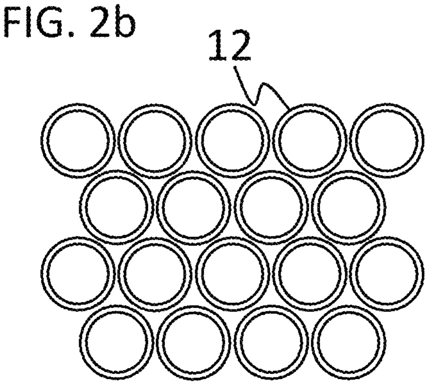
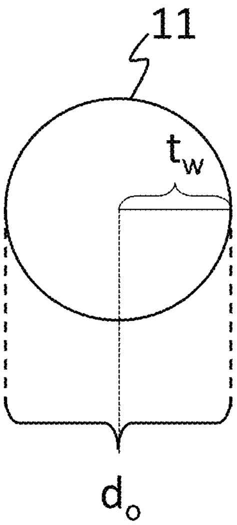
FIG. 3a
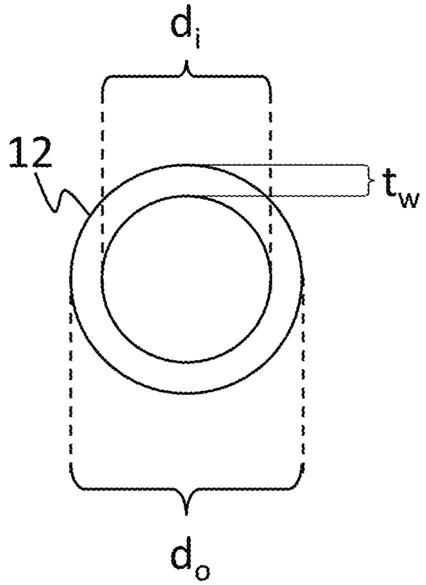
FIG. 3b

BUNDLE OF TUBULAR AND/OR ROD-SHAPED GLASS ARTICLES, METHOD FOR ITS FABRICATION AS WELL AS FOR UNPACKING SAID BUNDLE

CROSS REFERENCE TO RELATED APPLICATIONS

This application is a continuation of U.S. Ser. No. 17/190,313, filed Mar. 2, 2021, which claims benefit under 35 USC § 119 from European Application EP 20 160 473.3, filed Mar. 2, 2020, both of which are incorporated herein by reference in their entireties.

BACKGROUND

1. Field of the Invention

The present invention relates to a bundle of tubular and/or rod-shaped glass articles, a method for bundling such glass articles, as well as to a method for unpacking such a bundle.

2. Description of Related Art

Tubular and/or rod-shaped glass articles are common half-finished or pre-products used, for example, for pharmaceutical packing, i.e. for the production of glass vials, ampoules, syringes, cartridges or the like, or for glass fibres. Further production processes may take place in specialised production sites. Therefore, after melting and hot forming, tubular and/or rod-shaped glass articles are usually shipped to such further production sites. For an easy and cost efficient shipment, a certain plurality of tubular and/or rod-shaped glass articles are usually combined to a bundle. In such a bundle, the tubular and/or rod-shaped glass articles are usually arranged in a way that, when viewed in a direction along the length of the glass articles, they form a close or dense packing. In order to ensure safe shipment and to prevent relative movement of the glass rods and/or glass tubes, such as scrabbing or rubbing, as far as possible, the bundle may be fixed for example, by using a belt or a heat-shrink tubing.

However, in a bundle with a close packing of rod-shaped and/or tubular glass articles, adjacent rod-shaped and/or tubular glass articles are in direct contact. Further, even if the bundle is fixed in order to at least lessen relative movement of adjacent glass tubes and/or glass rods, a certain amount of such relative movement cannot be avoided during shipment and/or handling of such a bundle. This is a strong drawback, as this relative movement may result in surface defects like scratches that my deteriorate the strength, Further, as a result of scratching, particles arise. However, these particles are detrimental for the production of pharmaceutical packaging, as particle free processes and/or products are required, for example, in pharmaceutical packaging, especially for high-end pharmaceutical products. For such high-end products where high quality is required, glass rods and/or glass tubes with surface defects and/or with a high particle load (or particle contamination) which result from scratching as described above typically are not apt to be used further.

The occurrence of such surface defects could be in principle avoided by wrapping each glass rod and/or glass tube individually in a cardboard box or plastic tube, like a heat-shrink tubing, for example. These cardboard boxes and/or plastic tubes may cover the entire glass rods and/or glass tubes or only parts thereof. Such single-packaged glass rods and/or glass tubes may then be combined to a bundle of glass rods and/or glass tubes, as described above. However, such a single packaging has several disadvantages, as it is very expensive, especially taking into account that the articles in question, namely, glass rods and/or glass tubes, are half-finished products and that packing and un-packing requires much time and effort. Furthermore, a rather huge quantity of packing materials are needed that usually are not reusable, thus being disadvantageous in terms of sustainability.

German patent application DE 27 29 966 A1 relates to a method for packaging tubes or rods, wherein tubes or rods of equal length are arranged in a close packed bundle, both ends of which are wrapped in a flexible material, like a foil or a film, for example, a polymeric or plastic film, in order to fasten the rods or tubes or the bundle, respectively.

Japanese patent application JP H09-295686 A discloses a glass tube packaging body with a plurality of stages with spacers.

Patent document DD 82301 relates to a packaging for tubular glass bodies, the packaging comprising corrugated card board.

Patent document DD 224 555 A1 relates to a heat-shrink tubing for the packaging of glass tubes or glass rods.

German utility model DE 201 21 582 U1 relates to a packaging for glass tubes. Both ends of the glass tubes are covered by a cap. The glass tubes are then assembled in a bundle, both ends of which are covered by a shrink wrap film.

International patent application WO 2015/037361 A1 relates to a glass tube package comprising a glass tube bundle with spacers, both ends of the glass tube bundle being covered by a shrink wrap film. In U.S. Pat. No. 4,385,696 A, a plurality of containers are interconnected by flexible belts.

European patent application EP 0 132 587 A1 discloses a bundle of tubes. The tubes are arranged in stacked layers of tubes. Between each layer, a slip-resistant film is arranged.

US patent specification U.S. Pat. No. 3,373,540 A discloses a method for bundling elongated articles wherein a tensilely strong supple material wrapped around the elongated articles at least partially. However, U.S. Pat. No. 3,373,540 A does not teach the use of thread-like elements in combination with tubular and/or rod-shaped glass articles, but lists a variety of tensilely strong supple materials, such as cord, yard, twine, thread, rope, band, ribbon tape and so forth. Further, as can be seen from the schematic figures of U.S. Pat. No. 3,373,540 A, as well as from the corresponding description, a single line 11 tensilely string supple material is used, that is entwined about and between the articles to be bundles in a rather complicated way. Further, line 11 is a rather rigid material with a large cross section. While this large cross section ensures a large enough spacing of the bundled articles, the resulting ladder-like structure is rather inflexible and further results in a rather space-consuming bundle. Furthermore, rather rigid, solid line 11 is not well suited for fixing or fastening of the elongated articles to be bundled but allows for sliding of the articles in the loops formed by line 11 along the length of the bundle.

German patent specification DE 42 25 876 C2 relates to an apparatus for bundling rid-shaped articles. A flexible, foil-like or film-like material is placed between the rod-shaped articles.

US patent specification U.S. Pat. No. 3,294,225 A relates to a combined shipping package as well as to a protective armour for glass pipes, said armour being an encasement for a single glass pipe Several encased glass pipes may be combined to form a bundle.

However, none of the so-far proposed solutions properly takes into account that bundles of tubular and/or rod-shaped articles will, in order to provide for a cost-efficient shipment, be stacked onto each other on pallets. That is, already during palletizing and/or during subsequent transportation, there may be relative movement of the glass articles not only in a single bundle, but also a relative movement of bundles in a pallet. Particularly, it has been found out that in case of such relative movement of pallets, bundles in an upper position in a bundle may exert excessive mechanicals loads onto bundles placed underneath. These excessive mechanicals loads may result in direct contact of the glass articles and therefore in defects in the surface of the glass articles, like scratches.

These problems may, in principle, be overcome by spacing apart the glass articles in each bundle. However, as discussed above, either wrapping each glass article individually is required or otherwise glass articles have to be spaced significantly, which results in increased packing sizes. Both measures are, therefore, disadvantageous, as they are either time-consuming and/or will result in increased shipment costs.

Further, as can be seen for example from FIG. 1 of US patent specification U.S. Pat. No. 3,373,540 A, standard methods for forming bundles do not address the question of unpacking of such a bundle. The ladder-like structure proposed by US patent specification U.S. Pat. No. 3,373,540 A is rolled to form a bundle, which results in the need to either unroll the bundle or to pull the articles lengthwise (or both) in order to retrieve and singularize the bundled articles. Either way results in a rather complicated, time and/or space consuming method that is prone to failure, for example because of glass breakage due to striking against machine parts during pulling.

Therefore, there is a need for bundles of tubular and/or rod-shaped glass articles that overcome the drawbacks of the state of the art at least partially. The problem of the present invention is therefore to provide for a bundle of tubular and/or rod-shaped glass articles that show the drawbacks of the state of the art at least only to a lesser degree, if at all.

Further, the problem of the present invention is according to further aspects directed towards a method of bundling as and to a method of unpacking of a bundle that overcome the drawbacks of the state of the art at least partially.

SUMMARY

It is an object of the invention to ameliorate or overcome the aforementioned drawbacks of prior art packaging methods and devices.

The present disclosure therefore relates to a bundle of tubular and/or rod-shaped glass articles, the longest dimension of the tubular and/or rod-shaped glass articles extending in a first direction of a Cartesian coordinate system, defining a length l of the tubular and/or rod-shaped glass articles, comprising a number $N_L$ of layers of tubular and/or rod-shaped glass articles, the glass articles in each layer being arranged side by side in a second direction of the Cartesian coordinate system perpendicular to the first direction, wherein $N_L$ is at least 2, wherein the $N_L$ layers of the tubular and/or rod-shaped glass articles are arranged side by side in a third direction of the Cartesian coordinate system, the third direction being perpendicular to the first and second direction, preferably forming a close packing of tubular and/or rod-shaped glass articles when viewed along the first direction, and at least one thread-like element wrapped around at least two tubular and/or rod-shaped glass articles in at least one of the $N_L$ layers of the tubular and/or rod-shaped glass articles at least partially so that the at least two glass articles are spaced apart, the at least one thread-like element preferably surrounding the at least two glass articles at least partially, wherein the at least one thread-like element has a cross section of at least $c_t$, wherein $c_t$ is the minimum cross-section of the thread-like element, and wherein the at least one thread-like element is wrapped around the glass articles at least partially at least in $n_t$ different spacer positions along the length of the glass articles, wherein $n_t$ corresponds to the minimum number of different spacer positions, and wherein $n_t$ and $c_t$ are selected according to the following table:

| | $C_R$ - value | | | |
|---|---|---|---|---|
| $N_L$ | Less than 3000 | 6000 . . . 12000 | 12000 . . . 20000 | More than 20000 |
| Less than 8 | $n_t \geq 2$ $c_t \geq 0.5$ mm preferably ≥0.6 mm, more preferably ≥0.7 mm more particularly preferably ≥0.8 mm and most preferably ≥0.9 mm | $n_t \geq 2$ preferably $n_t \geq 3$ $c_t \geq 0.5$ mm preferably ≥0.6 mm, more preferably ≥0.7 mm more particularly preferably ≥0.8 mm and most preferably ≥0.9 mm | $n_t \geq 3$, preferably $n_t \geq 4$ $c_t \geq 0.9$ mm preferably ≥1.0 mm, more preferably ≥1.2 mm | $n_t \geq 4$, preferably $n_t \geq 5$ $c_t \geq 1.0$ mm preferably ≥1.2 mm, more preferably ≥1.5 mm |
| 8 to 12 | $n_t \geq 2$ $c_t \geq 0.6$ mm preferably ≥0.7 mm, more preferably ≥0.8 mm more particularly preferably ≥0.9 mm and most preferably ≥1.0 mm | $n_t \geq 2$ preferably $n_t \geq 3$ $c_t \geq 0.6$ mm preferably ≥0.7 mm, more preferably ≥0.8 mm more particularly preferably ≥0.9 mm and most preferably ≥1.0 mm | $n_t \geq 3$, preferably $n_t \geq 4$ $c_t \geq 1.0$ mm preferably ≥1.1 mm, more preferably ≥1.3 mm | $n_t \geq 4$, preferably $n_t \geq 5$ $c_t \geq 1.1$ mm preferably ≥1.3 mm, more preferably ≥1.6 mm |

-continued

| $N_L$ | $C_R$ - value Less than 3000 | 6000 . . . 12000 | 12000 . . . 20000 | More than 20000 |
|---|---|---|---|---|
| More than 12 | $n_t \geq 3$ $c_t \geq 0.7$ mm preferably ≥0.8 mm, more preferably ≥0.9 mm more particularly preferably ≥1.0 mm and most preferably ≥1.1 | $n_t \geq 3$ $c_t \geq 0.7$ mm preferably ≥0.8 mm, more preferably ≥0.9 mm, more particularly preferably ≥1.0 mm and most preferably ≥1.1 mm | $n_t \geq 3$, preferably $n_t \geq 4$ $c_t \geq 1.1$ mm preferably ≥1.2 mm, more preferably ≥1.4 mm | $n_t \geq 4$, preferably $n_t \geq 5$ $c_t \geq 1.2$ mm preferably ≥1.4 mm, more preferably ≥1.7 mm |

wherein $N_L$ corresponds to the number of layers, wherein the $C_R$-value corresponds to:

$$C_R = \frac{l^2}{d_o^2 + 2t_w^2 - 2d_o \cdot t_w}$$

wherein l corresponds to the length of the glass articles in mm, $d_o$ is the outer diameter of the glass articles in mm, $t_w$ is the wall thickness of the glass articles in mm, wherein the wall thickness of a rod-shaped article is equal to one half of the outer diameter.

Such an embodiment of a bundle of rod-shaped and/or tubular glass articles offers several advantages.

By the means of a thread-like element, at least two of the glass articles in at least one of the $N_L$ layers of glass articles are spaced apart. It is preferred that all glass articles in a layer, preferably in all layers (and so, all tubular and/or rod-shaped glass articles comprised in the bundle), are spaced apart, in order to prevent surface defects caused by relative movement of the tubular and/or rod-shaped glass articles in the bundle during handling and/or shipping of the bundle. This is advantageous, as in this way there will be less deficient tubular and/or rod-shaped articles that cannot be used in subsequent production processes. Further, as scratching is reduced, particle contamination of the tubular and/or rod-shaped glass articles will be lower compared to standard packaging methods without spacers. Therefore, it is advantageous to use glass articles spaced apart by a thread-like element for the production of pharmaceutical packaging products, like glass vials, ampoules, cartridges, syringes or the like.

Further, thread-like elements, like threads, yarn, twine, strings or the like, are quite commonly known materials, therefore available in a huge variety of materials, quality and quantity and at comparably low cost.

The at least one thread-like element has a cross section of at least $c_t$, wherein $c_t$ is the minimum cross-section of the thread-like element, and the at least one thread-like element is wrapped around at least partially at least in $n_t$ different spacer positions along the length of the glass articles, wherein $n_t$ is the minimum number of different spacer positions and wherein $n_t$ and $c_t$ are selected according to the following table:

| $N_L$ | $C_R$ - value Less than 3000 | 6000 . . . 12000 | 12000 . . . 20000 | More than 20000 |
|---|---|---|---|---|
| Less than 8 | $n_t \geq 2$ $c_t \geq 0.5$ mm preferably ≥0.6 mm, more preferably ≥0.7 mm more particularly preferably ≥0.8 mm and most preferably ≥0.9 mm | $n_t \geq 2$ preferably $n_t \geq 3$ $c_t \geq 0.5$ mm preferably ≥0.6 mm, more preferably ≥0.7 mm more particularly preferably ≥0.8 mm and most preferably ≥0.9 mm | $n_t \geq 3$, preferably $n_t \geq 4$ $c_t \geq 0.9$ mm preferably ≥1.0 mm, more preferably ≥1.2 mm | $n_t \geq 4$, preferably $n_t \geq 5$ $c_t \geq 1.0$ mm preferably ≥1.2 mm, more preferably ≥1.5 mm |
| 8 to 12 | $n_t \geq 2$ $c_t \geq 0.6$ mm preferably ≥0.7 mm, more preferably ≥0.8 mm more particularly preferably ≥0.9 mm and most preferably ≥1.0 mm | $n_t \geq 2$ preferably $n_t \geq 3$ $c_t \geq 0.6$ mm preferably ≥0.7 mm, more preferably ≥0.8 mm more particularly preferably ≥0.9 mm and most preferably ≥1.0 mm | $n_t \geq 3$, preferably $n_t \geq 4$ $c_t \geq 1.0$ mm preferably ≥1.1 mm, more preferably ≥1.3 mm | $n_t \geq 4$, preferably $n_t \geq 5$ $c_t \geq 1.1$ mm preferably ≥1.3 mm, more preferably ≥1.6 mm |
| More than 12 | $n_t \geq 3$ $c_t \geq 0.7$ mm preferably ≥0.8 mm, more preferably ≥0.9 mm | $n_t \geq 3$ $c_t \geq 0.7$ mm preferably ≥0.8 mm, more preferably ≥0.9 mm, | $n_t \geq 3$, preferably $n_t \geq 4$ $c_t \geq 1.1$ mm preferably ≥1.2 mm, | $n_t \geq 4$, preferably $n_t \geq 5$ $c_t \geq 1.2$ mm preferably ≥1.4 mm, |

-continued

| | $C_R$ - value | | | |
|---|---|---|---|---|
| $N_L$ | Less than 3000 | 6000 . . . 12000 | 12000 . . . 20000 | More than 20000 |
| | more particularly preferably ≥1.0 mm and most preferably ≥1.1 | more particularly preferably ≥1.0 mm and most preferably ≥1.1 mm | more preferably ≥1.4 mm | more preferably ≥1.7 mm |

wherein $N_L$ corresponds to the number of layers and wherein the $C_R$-value corresponds to:

$$C_R = \frac{l^2}{d_o^2 + 2t_w^2 - 2d_o \cdot t_w}$$

wherein l corresponds to the length of the glass articles in mm, $d_o$ is the outer diameter of the glass articles in mm, $t_w$ is the wall thickness of the glass articles in mm, wherein the wall thickness of a rod-shaped article is equal to one half of the outer diameter.

Preferably, the $C_R$-value of the glass articles is between 3000 and 30000.

This is advantageous in terms of cost, efficiency and sustainability, as it allows to determine the minimum value of spacer positions along the length of the tubular and/or rod-shaped articles where a thread-like element of a particular thickness needs to be wrapped around the glass articles at least partially in order to minimize direct contact between the glass articles taking into account size of the bundle, characterized by $N_L$, the number of layers of glass articles arranged side by side, that is, for example, on top of each other, as well as characteristics of the glass articles to be packed, that is, their outer diameters and the respective wall thicknesses. It is to be noted that the wall thickness of a rod-shaped article, that is, in the scope of a present disclosure, a solid glass cylinder, corresponds to one-half of the outer diameter or the radius of the rod-shaped article.

According to an embodiment, the bundle has a bending stiffness of at least $5*10^9$ $Nmm^2$ and at most $25*10^{11}$ $Nmm^2$.

According to an embodiment, the at least one thread-like element is fastened or tied, thereby forming at least one knot, preferably by forming at least one loop or bight, such as a loop knot. According to a particularly preferred embodiment, a knot, such as a loop knot, with an adhesive force, preferably a maximum adhesive force, between about 0.1 N and 4.0 N, preferably between 0.4 N and 3.5 N is formed. Further, several knots, for example corresponding to the number of tubular and/or rod-shaped articles bundled or arranged within a layer of the bundle, or to a multiple of this number, may be formed. Preferably, several knots are formed in a like manner, so that all knots formed correspond to the same knot type.

In the scope of the present disclosure, a knot is understood to refer to any intentional complication to a thread-like element, such as cord or yarn or a thread or any other thread-like element. "Complication", in the sense of the disclosure, may be any form of entwining, interlacing, or wrapping of a thread-like element, for example by forming loops or bights or the like. Knots may be formed by tying, or else by techniques such as knotting, sewing and stitching, in order to fasten or secure or constrict objects, for example, and may be accomplished by using any kind of suitable means, such as a needle.

Particularly preferably, the knot or knots formed are releasable knots, that is, a knot or knots that may easily be untied by pulling. Further preferably, the knot or knots formed are non-jamming knots.

Adhesive force of a knot is understood to refer to the force between the parts of the thread-like element or thread-like elements, in case the knot is formed by tying of tying several thread-like elements, for example, two thread-like elements, that is, the force holding the different parts of the thread-like element or element together. Adhesive force of a knot in the sense of the present disclosure is therefore understood to refer to the force necessary to untie the knot, thereby releasing or unwrapping the thread-like element or the thread-like elements. In that sense, the minimum force necessary for untying the knot, for example by pulling the thread-like element (also denoted as "pulling force" in the sense of the disclosure), has the same absolute value than the maximum adhesive force of said knot. Adhesive force of a knot in a bundle or layer of tubular and/or rod-shaped articles may be influenced by a normal force acting on both the thread-like element or elem1.6ents and the articles, for example, because of the weight of the glass articles, causing the thread-like elements and the glass articles to be more closely stacked upon each other, thereby increasing the force needed to undue the knot or knots. Therefore, when reference is made to adhesive force of a knot, this preferably refers to the adhesive force of a knot in a top layer or single layer of tubular and/or rod-shaped glass articles.

According to an embodiment, the adhesive force, preferably the maximum adhesive force of a knot is set between at least 0.1 N and at most 4.0 N. That is, a minimum pulling force, preferably a force acting in an axial direction of the thread-like element, of 0.1 N and at most 4.0 N is necessary to undue the knot. Pulling force, in the sense of the disclosure, is a force acting on a loose or free end of a thread-like element forming the knots or, in case the knot is formed by more than one thread-like element, of one end of at least one of the thread-like elements forming the knot. Preferably, the pulling force is acting in an axial direction of the thread-like element.

"Minimum pulling force", in the sense of the disclosure, is the minimum pulling force needed to untie a knot. It is to be noted here that for knots of the same type, this minimum pulling force still may differ, as may the corresponding maximum adhesive force of the respective knot. Minimum pulling forces as well as maximum adhesive forces may therefore preferably given by indicating a range or an average value. Further, upon pulling a free end of a thread tied to a knot, the force may differ over time corresponding to different stages of the process of untying. It is understood here that the minimum pulling force indicates that force necessary for releasing the knot, for example by pulling the thread back through the knot, thereby overcoming the adhesive force stored within the knot.

Inventors found out that the adhesive force of a knot and, thus, the pulling force necessary to untie or undue a knot in a bundle or layer of tubular and/or rod-shaped glass articles according to embodiments are further influenced by the cross section of said glass articles.

Preferably, in case of cross section of tubular and/or rod-shaped glass articles having cross sections ranging from 6 mm and 50 mm, minimum pulling forces (corresponding, as has already been pointed out above, to the maximum adhesive force of the knot) between about 0.4 N and about 4.0 N, preferably between about 0.4 N and about 3.5 N, are required for untying of a knot, with an average minimum pulling force of about 1.6 N.

In case of cross sections of the tubular and/or rod-shaped glass articles ranging from 6.8 mm to 14.49 mm, the minimum pulling force required may range from 1.3 N to 3.5 N, for example from 1.3 N to 3.2 N, with an average minimum pulling force ranging from 1.9 N to 2.2 N.

In case of cross sections of tubular and/or rod-shaped glass articles ranging from 14.5 mm to 24.9 mm, the minimum pulling force may range from 1.0 N to 2.5 N, for example, in particular from 1.0 N to 2.2 N, with an average minimum pulling force ranging from 1.5 N to 1.7 N, approximately.

In case of cross sections of tubular and/or rod-shaped glass articles ranging from 25 mm to 34.9 mm, the minimum pulling force required may range from 0.4 N to 2.7 N, for example from 1.4 N to 2.5 N, with an average minimum pulling force ranging from 1.1 N to 1.3 N.

In case of cross sections of tubular and/or rod-shaped glass articles ranging from 35 mm to 50 mm, the minimum pulling force required may range from 0.6 N to 1.6 N, for example from 0.6 N to 1.4 N, with an average minimum pulling force ranging from 0.8 N to 1.0 N.

Knots that are particularly well suited to be easily undone or released are slipped knots (also known as quick release knots or slipped loops) or running knots. Therefore, according to a particularly preferred embodiment, the thread-like element or the thread-like elements is or are fastened to form a slipped knot or a running knot. Preferably, all knots formed within a layer of tubular and/or rod-shaped glass articles or within a bundle of tubular and/or rod-shaped glass articles are formed as slipped knots or running knots. A slipped knot or a running knot may easily be undone by pulling one free end of a thread-like element forming the knot, or, in case the knot is formed by more than one thread-like element, by pulling one free end of at least one thread-like element forming the knot.

An embodiment with the thread-like element or elements forming a knot is particularly well suited to securely fasten and fix the tubular and/or rod-shaped glass articles. However, in order to provide a bundle that may easily be handled in further processing of the glass articles, it is preferred to provide a bundle that may easily be unpacked. This can be achieved in a quick and easy manner by tying of a slipped or running knot or knots, as in that case, unpacking of the bundle, thereby releasing the tubular and/or rod-shaped articles, may simply be accomplished by pulling one free end of at least one thread-like element forming the knot or knots.

According to a further, particularly preferred embodiment, the knot or knots may be formed by using a machine, for example by stitching using an industrial sewing machine.

In case at least one knot is formed, it may be preferred that the at least one thread-like element is a multiple strand thread.

According to an embodiment, the thread-like element is positioned in spacer positions along the length of the tubular and/or rod-shaped glass articles. The spacer positions are preferably spaced apart at distances between 20 cm and 90 cm, more preferably between 20 cm and 80 cm, more particularly preferably between 40 cm and 60 cm, however, it has been shown that the spacer positions are preferably selected as a function of the length of the tubular and/or rod-shaped glass articles and, hence, the bundle and the number of spacer positions.

Furthermore, the thread-like element according to the present disclosure may have according to an embodiment of the bundle a cross section (or diameter, or outer dimension) of about at most 4.0 mm, or even of about at most 2.5 mm, meaning that, especially when compared with ribbons, or cardboard or paper layers or other means for spacing apart that have been used in the state of the art, only a very small quantity of material is necessary. Therefore, using a thread-like element as spacer in a bundle of rod-shaped and/or tubular glass articles is not only advantageous in terms of cost and material availability, but also in terms of environmental and sustainability issues. However, in order to provide for a large enough spacing, the cross section of the thread-like element may at least be of about 0.25 mm, preferably of about at least 0.5 mm or even more than 0.5 mm.

According to an embodiment, the cross section of the at least one thread-like element is between at least 0.25 mm to at most 2.5 mm. According to another embodiment, the cross section of the at least one thread-like element is between at least 1.5 mm to at most 2.5 mm. According to a further embodiment, the cross section is between at least 0.25 mm to at most 1.25 mm. According to a further embodiment, the cross section is between at least 0.25 mm to about at most 1.0 mm.

The at least one thread-like element may have a cross section of 0.1 mm, or 0.2 mm, or 0.3 mm, or 0.4 mm, or 0.5 mm, or 0.6 mm, or 0.7 mm, or 0.8 mm, or 0.9 mm, or 0.95 mm, or 1.0 mm, or 1.05 mm, or 1.1 mm, or 1.5 mm.

The three dimensions of the Cartesian coordinate system may also be denoted as x, y, and z directions.

The cross section of the thread-like element may be determined in accordance with and/or on the basis of the projection microscope method as described, for example, in DIN EN ISO 137.

Furthermore, additionally or alternatively, the bending stiffness of the bundle may be between of about at least $5*10^9$ $Nmm^2$ and of about at most $25*10^{11}$ $Nmm^2$. Such an embodiment is favourable, as here, the glass articles are sufficiently stiff as to provide a stable bundle (or package) without need of reinforcing packaging components. That is, the bundle may be regarded as intrinsically stable. That is, when mention is made of the bending stiffness of the bundle, this relates to the bundle regarded as a whole, not to the stiffness of a single glass article.

The high bending stiffness of the bundle, resulting in the bundle being intrinsically stable, is according to an embodiment achieved by arranging the tubular and/or rod-shaped glass articles in layer that are subsequently stacked on top of each other. Upon stacking the layers, a very close packing of the glass articles may be achieved, such as a two-dimensional hexagonal close packing (when viewed along the length of the glass articles and/or the bundle).

The intrinsic stability of the bundle may further be promoted by tying the at least one thread-like element to at least one knot, as has been described in detail further above. Further, and preferably, knots may be formed at each spacer position, preferably so that the number of knots in a given layer and/or a given bundle formed by the at least one thread-like element at each spacer position corresponds to the number of glass articles (or an integer multiple thereof) in the respective layer and/or bundle. Furthermore, the at least one thread-like element, preferably all thread-line element within the bundle, form a tight connection with the surface of the tubular and/or rod-shaped articles via a frictional connection between the surface of the article or articles and the surface of the thread-like element or elements. That friction connection may also be regarded or denoted as a so called friction-locked or force-fit connection.

Particularly preferably, the intrinsic stability of the bundle may be promoted by tying a knot or knots with suitable adhesive forces. Suitable adhesive forces of knots for promoting intrinsic stability, for example by tying and fastening of the respective glass articles bundled together, thereby holding them in place, have been indicated further above.

The bending stiffness is the product of the Young's modulus times the geometrical moment of inertia of a body.

Additionally or alternatively, the tensile elasticity $C_S$ of the thread-like element may preferably be between of about at least 80 N to about at most 700 N. The tensile elasticity $C_S$ of a thread-like element may be measured in a measurement method as disclosed by ISO 6939 for determining the tensile strength of yarn. $C_S$, the tensile elasticity, is given the following equation:

$$C_S = L \cdot \frac{\Delta F}{\Delta L}$$

wherein L corresponds to the initial length of the thread-like-element, $\Delta L$ is the amount by which the length of the thread-like element changes, and $\Delta F$ is the change of the tensile force in the thread-like element, as determined in usual load-strain-curves, that is, by the ration of the strain (or relative elongation of the respective thread-like element $\Delta L/L$) and the change of the tensile strength, $\Delta F$, in the respective thread-like element.

This embodiment is favourable, as usually unpacking of the bundle is done by pulling the thread-like element, for example in order to untie knots in the thread-like element used to fasten the glass articles in the respective layer and/or the bundle. Therefore, a minimum tensile elasticity of about at least 80 N is advantageous.

During determination of the tensile elasticity of the thread-like element, it is advantageous to apply at least a minimum force $F_{Min}$ as well as applying a maximum force $F_{Max}$ during measurements. This maximum force $F_{Max}$ is, according to a particular embodiment of the present invention, at most half of the rupture force $F_{Rupt}$ at which value rupture of the thread-like element takes place. Preferably thread-like elements may be chosen such that their cross section $c_S$, tensile elasticity $C_S$ and minimum force $F_{Min}$, maximum force $F_{Max}$ and rupture force $F_{rupt}$ meet the specifications according to the following table:

| $c_t$ | $C_S$ | $F_{Min}$ | $F_{Max}$ | $F_{rupt}$ |
|---|---|---|---|---|
| Less than 1.0 mm | 80N-600N | 10N | 55N | 110N |
| 1.0 mm-1.5 mm | 80N-700N | 10N | 55N | 130N |

-continued

| $c_t$ | $C_S$ | $F_{Min}$ | $F_{Max}$ | $F_{rupt}$ |
|---|---|---|---|---|
| 1.5 mm-2.0 mm | 80N-700N | 15N | 70N | 140N |
| More than 2.0 mm | 80N-700N | 15N | 70N | 150N |

According to a further embodiment of the bundle, the thread-like element is positioned in at least $n_t$ spacer positions along the length of the tubular and/or rod-shaped glass articles in such a manner that the respective spacer positions can be defined by: a first distance a between the half-length of the tubular and/or rod-shaped articles and at least one first spacer position of at the least one thread-like element, a second distance b between the half-length of the tubular and/or rod-shaped articles and at least one second spacer position of the at least one thread-like element, and a third distance c between the half-length of the tubular and/or rod-shaped articles and at least one third spacer position of at the least one thread-like element, where a is smaller than b and b is smaller than c, wherein a, b and c are chosen according to the following table:

| $n_t$ | A | b | C |
|---|---|---|---|
| 2 | $0.25 \le a/L \le 0.29$ | | |
| 3 | $-0.015 \le a/L \le 0.015$ | $0.32 \le b/L \le 0.40$ | |
| 4 | $0.10 \le a/L \le 0.16$ | $0.36 \le b/L \le 0.43$ | |
| 5 | $-0.025 \le a/L \le 0.025$ | $0.18 \le b/L \le 0.24$ | $0.38 \le c/L \le 0.44$ |

Such an embodiment is particularly advantageous, as the tubular and/or rod-shaped glass articles will usually be bent along their length due to the elongated shape. That is, even if securely spaced apart by means of a spacer, like a thread-like element, at or near one or even both ends of the bundle, due to this bending there might still be direct contact between adjacent glass articles for example, at the half length of the glass articles especially taking into account handling and/or shipping of the bundle. Therefore, one might choose to position a spacer, like the thread-like element, at several spacer positions along the length of the glass articles, with short distances between these spacer positions, in order to overcome the problem of bending.

It has been found out, however, that the amount of bending and therefore, the risk of direct contact of the glass articles resulting in unwanted surface defects and thus, waste, can be minimized even for a minimum number of spacer positions. This takes into account that the amount of bending of an elongated glass article, such as a tubular or a rod-shaped glass article will, however, depends on the length of the glass articles as well as on the number of spacers arranged along its length. Here, the spacers—in the case of the present disclosure, the thread-like element or elements—may be understood as acting like a very small, nearly point-like support. If the thread-like element—or, in case more than one thread-like element is used, the thread-like elements—is positioned in spacer positions characterized by a, b and c in correspondence with the selection rules as disclosed above, then the risk of surface defects like scratches is minimized in a time and cost efficient way.

It is pointed out here that, apparently, in case of only two spacer positions, only the distance a will be relevant, of course, whereas the distance c will be relevant only in case of five or more spacer positions.

It may be preferred that the spacer positions are arranged symmetrically, that is, for uneven numbers of spacer positions, when a is 0 or nearly 0.

Preferably, there will be at least three different spacer positions that can be defined by distances a, b, and c, as explained above, wherein a, b, and c are chosen according to the following table:

| $n_r$ | a | b | c |
|---|---|---|---|
| 3 | $-0.02 \le a/L \le 0.02$ | $0.33 \le b/L \le 0.39$ | |
| 4 | $0.11 \le a/L \le 0.15$ | $0.38 \le b/L \le 0.42$ | |
| 5 | $-0.02 \le a/L \le 0.02$ | $0.19 \le b/L \le 0.23$ | $0.39 \le c/L \le 0.43$ |

According to an embodiment, the bundle further comprises at least one foil wrapped around the bundle radially in at least a portion thereof so that the film surrounds the bundle at least partially, wherein preferably the film surrounds the bundle at least in one spacer position thereof.

An embodiment where the bundle is wrapped in a film at least partially is favourable, as such a film serves as protection against soil and/or further damages to the outermost glass articles. Further, the bundle may be handled preferably so that gripping is effected in such a portion of the bundle where it is covered by the film. In this way, damage to the surface especially of glass articles positioned in the outermost layers of the bundle, for example, is further avoided or at least minimized.

Preferably, the film is arranged around the bundle in such a way that the film surrounds the bundles at least in one spacer position thereof. The film, for example, a heat-shrink tube of heat-shrink film, exerts a certain pressure upon the glass articles, especially the glass articles situated in corner positions in the bundle. This exertion of pressure is necessary, however, as the film aids in fastening the glass articles, such that a stable bundle with minimized relative movement of the glass articles during handling, transport and/or shipment results. However, as the film is wrapped around the bundle, the glass articles are pressed against each other. Therefore, in order to avoid direct contact of the surfaces of glass articles, it is advantageous to arrange the film in a spacer portion of the bundle, the thread-like element or elements in this portion preventing direct contact and, thus, damages to their surfaces.

This may be done in several different ways.

For example, according to an embodiment, the film is wrapped around the bundle over the complete length thereof. That is, the whole of the bundle may be covered by a heat-shrink tubing.

Such an embodiment offers several advantages. For example, the whole of the surface of the bundle is covered by a film, protection the bundle and, thus, the glass articles comprised by the bundle, is effected over the whole of the surface of the bundle. However, in this case a lot of waste results after unpacking of the bundle.

Therefore, it may be contemplated to arrange the film such that the film surrounds the bundle only in a middle portion thereof. In this case, at least one spacer position is at or at least near the half-length of the glass articles. It is pointed out that in length of the bundle is, of course, equal or at least very close to the length of the glass articles comprised by the bundle. In such an embodiment, preferably, the bundle comprises at least three spacer positions, wherein preferable the distance a, as defined above, preferably is 0.

According to a further embodiment, especially in a case where there is an even number of spacer position, it may additionally or alternatively be contemplated that the bundle comprises two films that are wrapped around the two end portions of the bundle. In such an embodiment, the end portions of the glass articles comprised be thy bundle will be protected, thereby further minimizing the risk of glass breakage that, as is commonly known, very often occurs at the edge portion of a glass article, such as a tubular and/or rod-shaped glass article.

According to a further embodiment of the bundle, the bundle comprises $n_r$ films so that each film surrounds the bundle in one of the $n_r$ spacer positions.

Preferably, the film is a heat-shrink film.

According to another embodiment of the bundle, the bundle comprises at least $n_r$ thread-like elements so that at each one of the $n_r$ different spacer positions, there is at least one separate thread-like element.

It is possible, according to the present disclosure, to use only one thread-like element as spacer, taking into account that a thread-like element, like yarn, is flexible and can easily be bent so that in principle, it is possible to use only one single thread-like element. However, the number of thread-like elements used will inter alia depend on the actual method used to wrap the thread-like element or elements around the tubular and/or rod-shaped glass articles at least partially. For example, it might be contemplated to employ a method where two thread-like elements will be employed as upper thread and lower thread in a sewing like method. Further, it might be contemplated to use separate thread-like elements at each spacer position, as this will allow wrapping of the thread-like elements at several spacer positions at the same time. This will be much quicker and it therefore preferred. Therefore, an embodiment where the bundle comprises at least $n_r$ thread-like elements so that at each one of the $n_r$ different spacer positions there is at least one separate thread-like element is advantageous especially in terms of time efficiency.

The thread-like element is preferably made of a plastic material. Preference is given to elastic polymer materials which enable the spacers to cushion vibrations of the glass articles occurring during shipping of glass article layers and glass articles bundles. The risk of breakage of the glass articles is thereby further reduced. The plastic material preferably comprises polypropylene (PP), polyethylene (PE), preferably high-density polyethylene (HDPE), polyethylene wax, polyamide (PA), styrene-acrylonitrile copolymer (SAN), polyester, polyethylene terephthalate (PET), polybutylene terephthalate (PBT), polyurethane (PU), acrylonitrile-butadiene-styrene copolymer (ABS), polyether ether ketone (PEEK), and/or polycarbonate (PC), or the plastic material consists of the one or more polymer(s) mentioned.

In particular, the thread-like element may comprise and/or contain polypropylene (PP), polyethylene, in particular high-density polyethylene (HDPE), polyethylene wax, polyamide (PA), styrene-acrylonitrile copolymer (SAN), polyester, polyethylene terephthalate (PET), polybutylene terephthalate (PBT), polyurethane (PU), acrylonitrile-butadiene-styrene copolymer (ABS), polyether ether ketone (PEEK), and/or polycarbonate (PC), or the thread-like element may be made of polypropylene (PP), polyethylene, in particular high-density polyethylene (HDPE), polyethylene wax, polyamide (PA), styrene-acrylonitrile copolymer (SAN), polyester, polyethylene terephthalate (PET), polybutylene terephthalate (PBT), polyurethane (PU), acrylonitrile-butadiene-styrene copolymer (ABS), polyether ether ketone (PEEK), and/or polycarbonate (PC).

Suitable materials comprised and/or contained by the thread-like element may be any one of polypropylene (PP) or polyethylene (PE), especially high-density polyethylene (HDPE), or polyamide, or styrene-acrylonitrile resin (SAN) or polyester or polyethylene terephthatalate (PET) or polybutylene terephthalate (PBT) or polyurethane (PU), or polycarbonate (PC) or acrylonitrile butadiene styrene (ABS) or polyether ether ketone (PEEK), or any combinations thereof. Here, the expression of the at least one thread-like element comprising a material or a material combination is to be understood to encompass that the at least one thread-like element may consist at least predominantly, that is, to more than 50 wt.-%, or essentially, that is, to more than 90 wt.-%, or even totally of a material or a material combination, respectively.

According to an embodiment of the bundle, therefore, the at least one thread-like element comprises or contains or consists at least predominantly or essentially or even totally of a plastic material selected from one of polypropylene (PP) or polyethylene (PE), especially high-density polyethylene (HDPE), or polyamide, or styrene-acrylonitrile resin (SAN) or polyester or polyethylene terephthatalate (PET) or polybutylene terephthalate (PBT) or polyurethane (PU), or polycarbonate (PC) or acrylonitrile butadiene styrene (ABS) or polyether ether ketone (PEEK), or any combinations thereof.

It has been found out that these materials may results in favourable properties of the thread-like element, such as, for example, a suitable surface energy and properties, like the mechanical properties, as well. A particularly preferred material is polyethylene, especially high density polyethylene (also known as HDPE).

According to yet another element of the bundle, the at least one thread-like element comprises or consists at least predominantly or essentially or even totally of a material with a Young's modulus between of about at least 500 MPa and of about at most 1000 MPa. This is favourable, as the material comprised by the thread-like element should be able to withstand high loads without a too strong change in dimension. This is because the bundles of glass articles are to be stacked in palettes, so that, as a result, the undermost layer of glass articles (and, thus, the thread-like element) may bear a load of several hundreds of kilograms. However, the Young's modulus should not be too high either, preferably not higher than 1000 MPa, which ensures that the thread-like element may be wrapped around the glass articles to be spaced apart at least partially in an quick and easy manner.

According to another embodiment of the bundle, the distance between the at least two spaced-apart tubular and/or rod-shaped glass articles is at least 0.5 mm, preferably between at least 0.6 mm and at most 0.7 mm. It has been found that a minimum distance of at least 0.5 mm is enough to prevent direct contact between the surfaces of adjacent glass articles in the same layer or in different layers. Preferably, the distance between the glass articles is between at least 0.6 mm and at most 0.7 mm.

If the distance were higher, this would result in a much increased packing size of the bundle. This would be unfavourable in terms of shipping.

The resulting distance between articles in a bundle may be adjusted by a careful choice of thread-like element materials and/or the way in which the thread-like element or elements are wrapped around the glass articles at least partially. However, the resulting distance is further influenced by the load of glass articles stacked upon each other.

In the scope of the present disclosure, the following definitions apply:

A bundle of tubular and/or rod-shaped glass articles is to be understood as a package of tubular and/or rod-shaped glass articles. Such packages are quite commonly known to the person skilled in the art.

A tubular glass article is to be understood as—at least taking into account usual production tolerances—a right circular hollow cylinder of glass that can be defined by a length—that equals the height of the cylinder—a diameter, meaning the maximum outer dimension of the tubular glass article perpendicular to its length, and a wall thickness. In the scope of the present disclosure, a rod-shaped glass article may mutatis mutandis be understood as—at least taking into account usual production tolerances—a right circular plain cylinder made of glass that may be defined by a length—that equals the height of the cylinder—and a diameter that is the maximum outer dimension of the rod-shaped glass article perpendicular to its length. The diameter or maximum outer dimension may, in the scope of the present disclosure, also be referred to as the cross-section. Further, both the tubular and the rod-shaped glass article may be understood to have a rotational axis—as usual, at least taking into account usual production tolerances. However, it is possible that the tubular and/or rod-shaped article according to the present disclosure may have cross section having a shape that deviates from a round or circular or nearly round or circular shape. For example, the cross section may have a polygonal or elliptic shape.

If reference is made to the cross section of a tubular and/or rod-shaped article, this refers to the outer dimension of the glass article in a cross-sectional view. The cross section may be between 6 mm and 50 mm, according to the desired end product.

By way of example, the cross section may be 6.85 mm, 8.15 mm, 10.85 mm, 14.45 mm, 17.05 mm, or 22.05 mm, in particular for a glass tube intended for a syringe body as the addressed final product, or may be 8.65 mm, 10.85 mm, 10.95 mm, 11.60 mm, 14.00 mm, 14.45 mm or 18.25 mm, in particular for so-called carpule tubes, or may range between 6.8 mm and 8.9 mm, or between 9.0 mm and 14.9 mm, or between 15.0 mm and 17.9 mm, or between 18.0 mm and 19.9 mm, or between 20.0 mm and 24.9 mm, or between 25.0 and 30.9 mm, or between 31.0 mm and 34.9 mm, or between 35.0 mm and 42.9 mm, or between 43.0 mm and 50.0 mm, in particular for glass tubes intended for vials as the addressed end products, or between 9.0 mm and 14.9 mm, or between 15.0 and 17.9 mm, or between 18.0 mm and 19.9 mm, or between 20.0 mm and 24.9 mm, in particular for glass tubes intended for ampoules as the addressed end products.

However, a round or circular—at least taking into account usual production tolerances—shape of the cross section is preferred. In the scope of the present disclosure, a cross section may be regarded as round or circular if the circularity error is less than a predetermined value. The circularity error, in this case, is a measure for the deviation of a given shape from the ideal circular shape, Here, a circumferential line of a cross section has to lie in a plane defined by two concentrical circles with a specific, predefined distance from each other. The actual value of the circularity error is one half of the maximum difference the outer diameters in the respective plane. In actual practice, instead of the circularity, the ovality may be given, wherein the ovality is the difference of the maximum outer cross section and the minimum outer cross section in a direction perpendicular to the length l of a rod-shaped or tubular glass article. The ovality is two times the value of the circularity error.

When, in the scope of the present disclosure, reference is made to a "minimum cross-section", this is to be understood as referring to the minimum diameter or minimum outer of an article, meaning that this article should at least have this minimum cross-section, however, the article may well be chosen to have a greater cross-section that this minimum value.

In the scope of the present disclosure, when mention is made of tubular and/or rod-shaped articles, these articles are to be understood as elongated glass articles, meaning that their length usually is about at least one dimension greater that the diameter. It is to be understood that the length of such an article is its outer dimension in a first dimension of a Cartesian coordinate system, whereas the diameter or cross-section are determined in a direction perpendicular to this first direction.

A layer of tubular and/or rod-shaped glass articles refers to tubular and/or rod-shaped glass articles that are arranged laterally side by side so that their rotational axes are essentially parallel to each other, meaning that the rotational axes form an angle of at most 5° with each other, preferably an angle of 0°.

When reference is made to a close packing of the tubular and/or rod-shaped articles, this is to be understood to refer to a two-dimensional close packing of equal circles and/or rings. That is, when the bundle is viewed along the length of the glass articles, these circles and/or rings are formed by the outer diameter of the tubular and/or rod-shaped glass articles. Further, in the scope of the present disclosure, a packing is regarded as a close packing even if the circles and/or rings do not contact each other directly, that is, even if the circles slightly are spaced apart, given the space between the circles is small compared to the cross section of the circles, that is, if the space between two circles is less than 16%, preferably less than 10%, more preferably less than 5%, the outer dimension (or diameter, or cross section) of the circles and/or rings.

When reference is made to the cross-section or outer diameter of a thread-like element, it is to be understood that this outer diameter of the thread-like element is determined by measuring the maximum outer dimension of the thread-like element in a dimension relative to the length of the thread-like element. In other words, the cross-section $c_t$ is the effective outer diameter of the thread-like element. In a corresponding manner, this definition applies to the cross-section or outer diameter of a strand.

Further, in it to be understood that in the scope of the present disclosure, the rod-shaped and/or tubular glass articles are, taking into account usual production tolerances, of equal length. The length of the tubular and/or rod-shaped glass articles may be between of about at least 0.5 m to about at most 2.5 m. For example, the length may be 1.2 m, or between 1.2 m and 1.8 m, or 1.5 m, or greater than 1.8 m.

"Thread-like element" is preferably understood to mean a thin item twisted from fibers or from strips of material. In the context of the disclosure, the term "thread-like element" also encompasses strings, lines and cords. Preferably, the thread-like element is a round cord, an oval cord, a braided cord or a string from twisted film strips, for example. The thread-like element may be made of an extruded material.

The present disclosure further relates to a use of a bundle of tubular and/or rod-shaped glass articles, preferably a bundle according embodiments of the present disclosure, for palletizing and/or shipping.

A further aspect of the present disclosure is directed towards a method for bundling tubular and/or rod-shaped glass articles to obtain a bundle, preferably a bundle according to embodiments of the present disclosure, comprising the following steps: wrapping a thread-like element around at least two tubular and/or rod-shaped glass articles at least partially in at least two spacer positions so that a layer of tubular and/or or rod-shaped glass articles is formed, wherein the at least two tubular and/or rod-shaped glass articles are spaced apart, preferably so that a knot is formed, repeating the wrapping step so that at least one further layer of tubular and/or rod-shaped glass articles is formed, and stacking the at least two layers of tubular and/or rod-shaped glass articles on top of each other to that a bundle of tubular and/or rod-shaped glass articles is obtained, wherein preferably the glass articles are spaced apart from each other.

Further, it may be contemplated that for a given spacer position within a bundle, several knots are formed, wherein the number of knots preferably corresponds to the number of glass articles in the bundle or to an integer multiple thereof. Such an embodiment may be particularly preferred, as in that way, glass articles may be securely fastened within the bundle. Further preferably, according to an embodiment, at each spacer position the at least one thread-like element may be formed to at least one knot, further preferably several knots are formed at each spacer position, wherein in particular the number of knots at each spacer position corresponding to the number of glass articles arranged within the bundle or to an integer multiple thereof.

Suitable thread-like-elements to be used in this method are disclosed in the present application.

A yet further aspect of the present disclosure is directed towards a method for unpacking a bundle of tubular and/or rod-shaped glass articles, preferably to a bundle according to any of the embodiments of the present disclosure and/or bundled according to the method of the disclosure. The method for unpacking comprises the following steps: providing a bundle of tubular and/or rod-shaped articles, positioning the bundle, preferably so that the tubular and/or rod-shaped articles are held in a locked position, and pulling a thread-like element that is wrapped around at least two tubular and/or rod-shaped articles at least partially so that the thread-like element is withdrawn from the bundle and/or a layer of tubular and/or rod-shaped glass articles.

In the sense of the disclosure, a locked or fixed position of a tubular and/or rod-shaped glass article is understood as a position in which the centre point of the respective glass article can only vary within a given, predetermined range. According to a preferred embodiment, the centre point of the glass articles may only vary within a perimeter of at most about 1 cm.

By pulling and withdrawing of the thread-like element, glass articles stacked within the bundle according to embodiments of the disclosure may be unwrapped, preferably so that each glass article may be taken from storage individually. It may also be provided for that while one glass article is unwrapped, for example by untying a knot formed by at least one thread-like element, further glass articles stay put, with positions within the bundle still fixed by at least one thread-like element.

This may generally, without being restricted to the method of unpacking a bundle, be achieved in a very simple manner for a bundle according to an embodiment wherein each glass article is fixed at least at one spacer position by a knot formed by at least one thread-like element. Preferably, according to a further embodiment of the bundle, the number of knots for a given spacer position corresponds to the number of articles bundled or to an integer multiple thereof. Further preferably, according to a yet further embodiment of the bundle, at each spacer position at least one knot is formed. Particularly preferably, at each spacer position several knots are formed, wherein the number of knots at each spacer position corresponds to the number of glass articles bundled together, or to an integer multiple thereof.

According to an embodiment, a slipped knot (also known as "quick release knot" or slipped loop) or running knot is formed. Preferably, all knots formed within a bundle correspond to the same type of knots. Particularly preferably, all knots formed are knots that may easily be undone, for example slipped knots or running knots, that is, knots that may easily be untied by pulling at least one free end of at least one thread-like element forming the knot or knots.

According to an embodiment of the method, a pulling force (or tension) that acts in on the thread-like element, preferably in an axial direction thereof, of between 0.1 N and 4 N.

As the minimum pulling force required to untie a knot corresponds to the maximum adhesive force in said knot, previous information on behalf of maximum adhesive force for knots in bundles according to embodiments applies to minimum pulling forces required for untying knots mutatis mutandis. Therefore, in case of a bundle comprising at least one knot formed by at least one thread-like element at at least one spacer position, the minimum pulling force, preferably the minimum pulling force acting in an axial direction of the at least one thread-like element, corresponds to the maximum adhesive force of said knot, as indicated further above.

According to a further embodiment, during unpacking, especially during pulling of at least one thread-like element, a supplemental normal force acting on the bundle and/or the tubular and/or rod-shaped articles and/or on a layer of tubular and/or rod-shaped articles is not greater than 100 N. A normal force, in that sense, may be according to an embodiment a weight load applied to the bundle so that the bundle (that is, the glass articles bundled together) stays put during pulling of the at least one thread-like element. For example, the bundle may be contacted with on overlay, thereby ensuring a fixed position of the bundle. However, such an extra normal force should preferably, if needed at all, be rather low, in order to avoid twisting and/or tilting of the bundled glass articles.

Unpacking may be effected with the bundle (and, respectively, the articles) lying flat, for example on an underlay, that is, with the bundle and/or the articles being stored or supported in a horizontal position. However, it may also be possible and may even be preferred to arrange the bundle during unpacking at an oblique angle, or even store it in an upright or vertical or nearly vertical position.

If mention is made of minimum pulling forces required for untying knots, this in particular refers to the case of a bundle stored or supported in a horizontal position.

Preferably, according to an embodiment, the minimum pulling force required for withdrawal of the at least one thread-like element is adjusted so that the self-weight of a layer of tubular and/or rod-shaped glass articles within a bundle is sufficient for keeping the glass articles in a locked or fixed position during pulling. That is, preferably, no extra normal force is required.

According to an embodiment, unpacking is achieved in a contact-free manner. Preferably, for example, no overlay is needed to ensure a locked position of the articles to be unbundled. That is, unpacking may simply be achieved by pulling at least one free end of at least one thread-like element.

According to a further embodiment, the bundle comprises at least two thread-like element, wherein one thread-like element is arranged in a first spacer position and the further thread-like element is arranged in a second spacer position, wherein each thread-like element is individually removable, preferably by pulling at least one free end thereof, wherein further preferably withdrawal and/or removing of the at least two different thread-like elements may be achieved simultaneously. According to an embodiment, the bundle may comprise three thread-like elements, each of which arranged in a different spaced position along the length of the bundle, and unpacking may be achieved by pulling one free end of each of these thread-like elements at the same time.

BRIEF DESCRIPTION OF THE DRAWINGS

The invention will now be further explained with reference to the figures. These show FIG. 1 is a schematic and not drawn to scale depiction of a tubular and/or rod-shaped glass article, FIGS. 2*a*-2*b* are schematic depictions of two-dimensional close packings FIGS. 3*a*-3*b* are schematic depictions of cross sections of different glass articles.

In the figures, like reference numerals refer to like or corresponding elements.

DETAILED DESCRIPTION

Figure 4A:
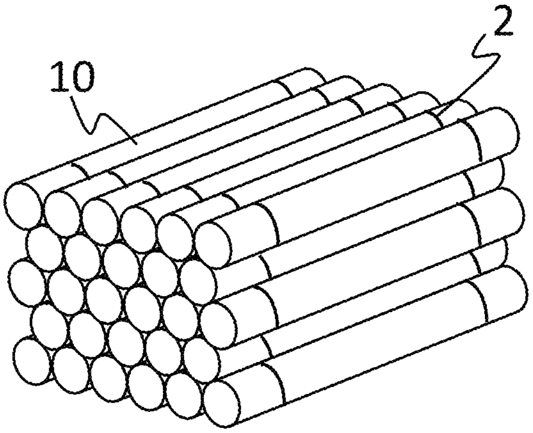
FIGS. 4*a*-4*b* are two schematic and not drawn to scale depictions of bundles of tubular and/or rod-shaped glass articles.

FIG. 1 is a schematic depiction of a tubular and/or rod-shaped glass article 1. The glass article has longest dimension l, likewise depicted in FIG. 1. The longest dimension—or simply length l—of the tubular and/or rod-shaped article 1 extends along a first direction of a Cartesian coordinate, that is, here in this case, from the left to the right of the figure.

FIGS. 2*a*-2*b* are schematic depictions of a close packing of equal circles in the sense of the present disclosure. In FIG. 2*a*, the close packing may be understood in this case as a cross-sectional view of a bundle of rod-shaped glass articles 11, whereas, in FIG. 2*b*, the close packing may be understood as a cross-sectional view of a bundle of tubular glass articles 12. For the sake of visibility, only one article 11, 12 has been indicated. It is pointed out that the arrangement of circles (as in FIG. 2*a*) or rings (as in FIG. 2*b*) each consists, in this case, of four different layers of circles or rings, respectively. These layers may be understood as a layer of rod-shaped glass articles or tubular shaped glass articles, the number of layers, $N_L$, being, in this case, 4. However, generally, without being bound be the depiction in FIGS. 2*a-b*, different, particularly higher, numbers of layers are possible, of course. Further, the circles or rings are spaced apart slightly.

Now, in FIG. 3*a* is a cross-sectional view of rod-shaped glass article (or glass rod) 11 with outer dimension $d_o$, the latter being equal to the diameter of the cross-section. In FIG. 3*b*, a cross-sectional view of tubular glass article 12 is shown. This cross-section can be defined by outer dimension $d_o$ and inner dimension $d_i$, wherein the wall thickness $t_w$ of the tubular glass article (or glass tube) 12 corresponds to:

$$t_w=½*(d_o-d_i).$$

It is to be noted that in the case of a rod-shaped glass article (or glass rod), the wall thickness corresponds to:

$$t_w=½*d_o,$$

as indicated in FIG. 3*a*. That is, the wall thickness $t_w$ may also be understood as the radius of the rod-shaped glass article (or glass rod).

Figure 4B:
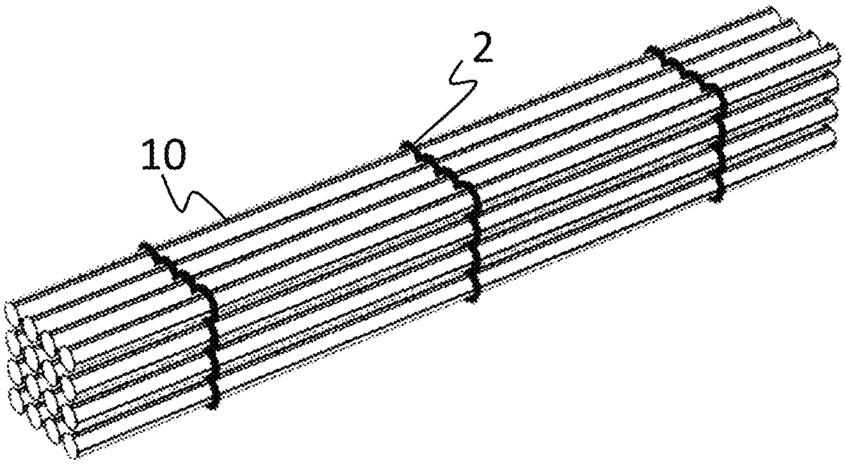

Now, with regard to FIGS. 4*a*-4*b*, two different embodiments of bundles 10 of tubular and/or rod-shaped glass articles 1 are shown.

FIG. 4*a* depicts schematically bundle 10, comprising tubular and/or rod-shaped glass articles as well as a thread-like element 2. As can be seen, the cross sections of tubular and/or rod-shaped glass articles 1 form a close packing here. Further, here, thread-like element 2 is positioned to the rear of the bundle 10 as well as near the front region. It may be noted that at both position, that is, to the rear and at the front, thread-like element 2 may be the same, that is, just one thread-like element is first wrapped around the glass articles at least partially at the rear side portions and, after that, at the front side portion. However, if may be more suitable to use, at each spacer position, a separate thread-like element 2. Further, it is to be noted that, according to the actual method used to wrap the thread-like element 2 around a glass article at least partially, more than one thread-like element may be present at a single spacer position, for example, an upper thread-like element and a lower thread-like element.

In FIG. 4*b* another bundle 10 is depicted. In this case, the rod-shaped and/or tubular glass articles have been arranged so that their cross sections form a simple cubic packing. Here, the thread-like element 2 is position at three different spacer positions.

Figure 5A:
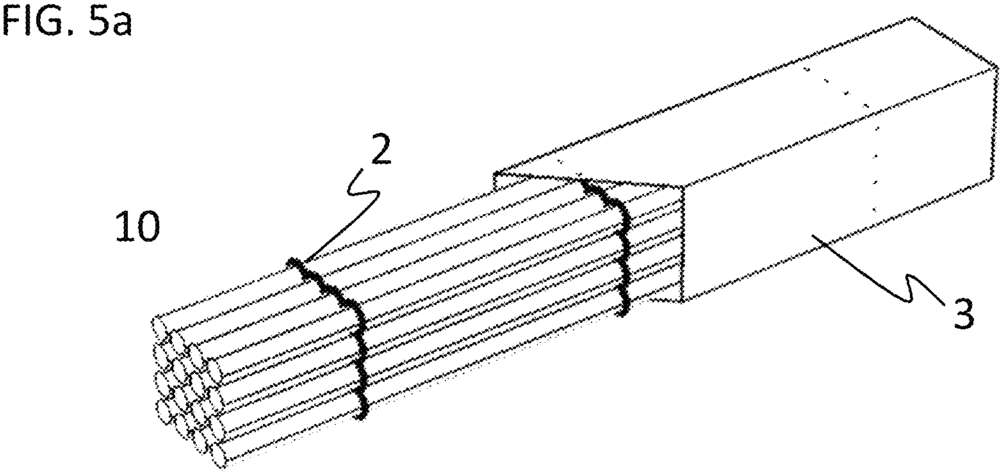
FIGS. 5*a*-5*c* are three schematic and not drawn to scale depictions of different embodiment of bundles.
Figure 5B:
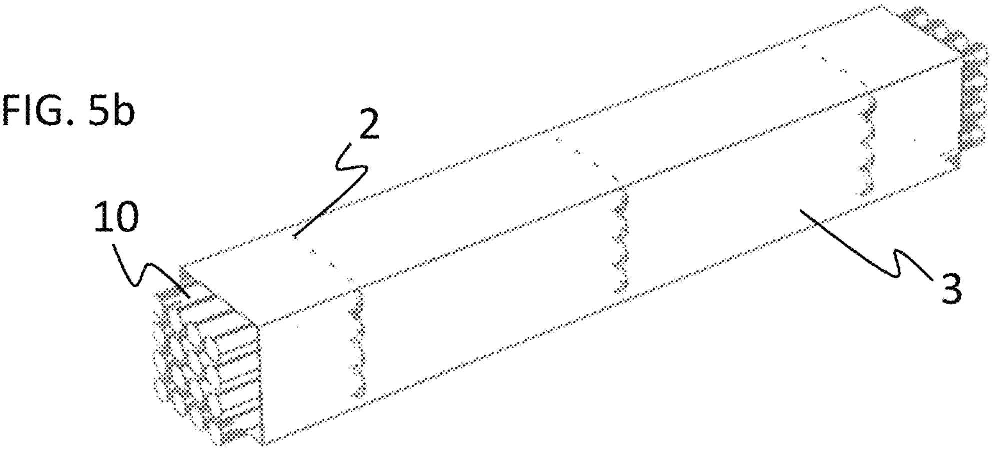
Figure 5C:
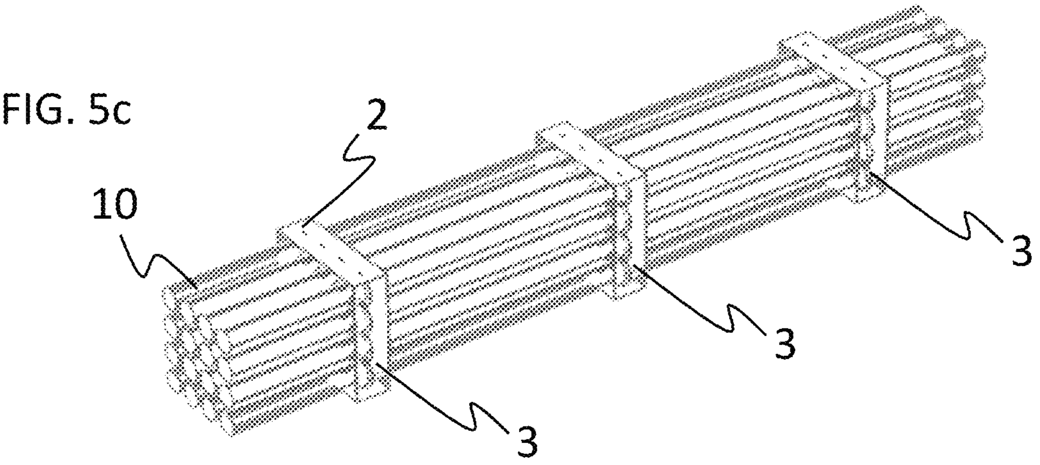

FIGS. 5*a*-5*c* shows three schematic and not drawn to scale depictions of bundles 10. Here, in each case, bundle 10 comprises thread-like element 2 that has been wrapped around the rod-shaped and/or tubular glass articles (not indicated) at least partially at three positions. Further, the bundles 10 each comprise at least one film 3 wrapped around bundle 10 radially. Now, in FIG. 5*a*, film 3 is wrapped around the bundle 10 completely, however, for the sake of visibility, film 3 is only depicted in the rear part of bundle 10.

FIG. 5*b* shows bundle 10. Here, the film 3 has been wrapped around bundle 10 only in a middle section thereof, so that both ends of bundle 10 remain free of film 3.

FIG. 5*x* shows yet another embodiment of bundle 10. Here, bundle 10 comprises three films 3 wrapped around bundle 10 radially so as to cover thread-like elements 2 (not indicated) at each of the three spacer positions. Such an embodiment is particularly preferable, as only a minimum amount of waste is produced.

Now, in FIGS. 6*a*-6*d*, a tubular and/or rod-shaped glass article 1 is depicted. It is once again pointed out that these depictions each are merely schematic depictions and not drawn to scale. The tubular and/or rod-shaped glass article 1 in each of FIGS. 6*a*-6*d* is bent. However, the amount of bending has been exaggerated for illustrational issues.

Figure 6A:
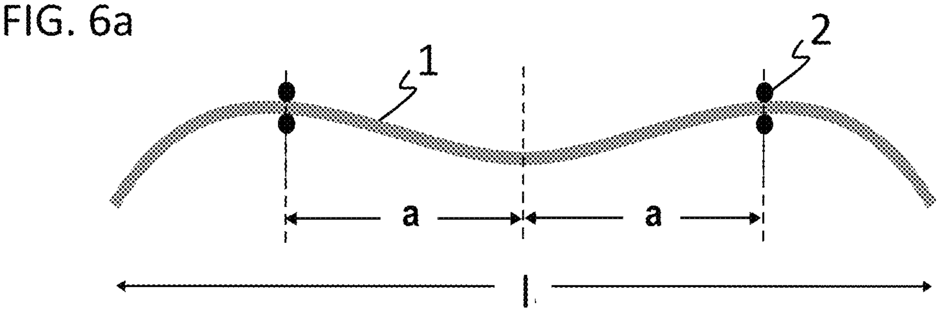
FIGS. 6*a*-6*d* are four schematic and not drawn to scale depictions of tubular and/or rod-shaped glass articles comprising thread-like elements at different spacer positions.

FIG. 6*a* shows the case where at least one thread-like element 2 has been positioned at to spacer positions $n_t$ along length l of the article 2. These positions may be characterized by distance a, a being a first distance a between the half-length of the tubular and/or rod-shaped articles and at least one first spacer position of at the least one thread-like element.

Figure 6B:
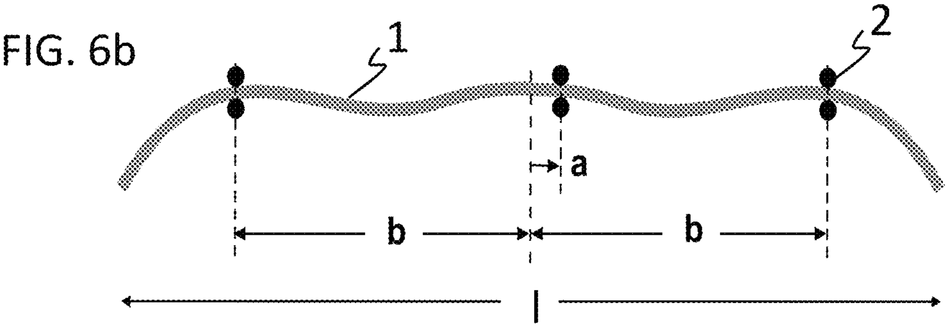

Now, if there are, as depicted in FIG. 6*b*, there are three spacer position $n_t$, these three positions can be characterized by distances a and b, a being a first distance a between the half-length of the tubular and/or rod-shaped articles and at least one first spacer position of at the least one thread-like element and b being a second distance b between the half-length of the tubular and/or rod-shaped articles and at least one second spacer position of the at least one thread-like element; a being smaller than b.

Figure 6C:
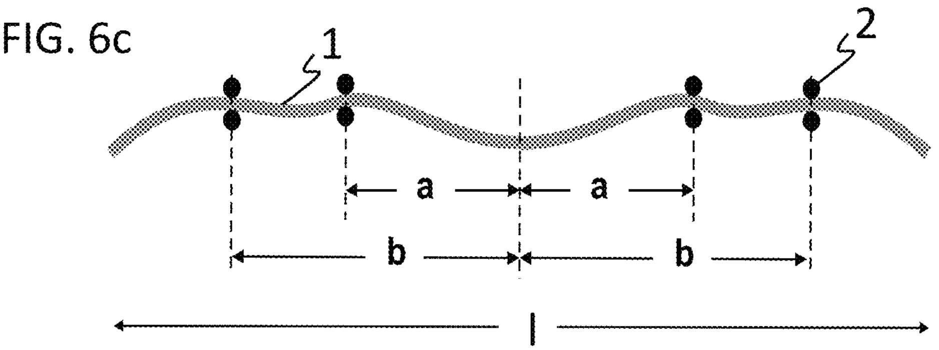

Further, in the case shown in FIG. 6*c*, four spacer positions are distributed along length l. These four positions can likewise be characterized by distances a and b, a being a first distance a between the half-length of the tubular and/or rod-shaped articles and at least one first spacer position of at the least one thread-like element and b being a second distance b between the half-length of the tubular and/or rod-shaped articles and at least one second spacer position of the at least one thread-like element; a being smaller than b.

Figure 6D:
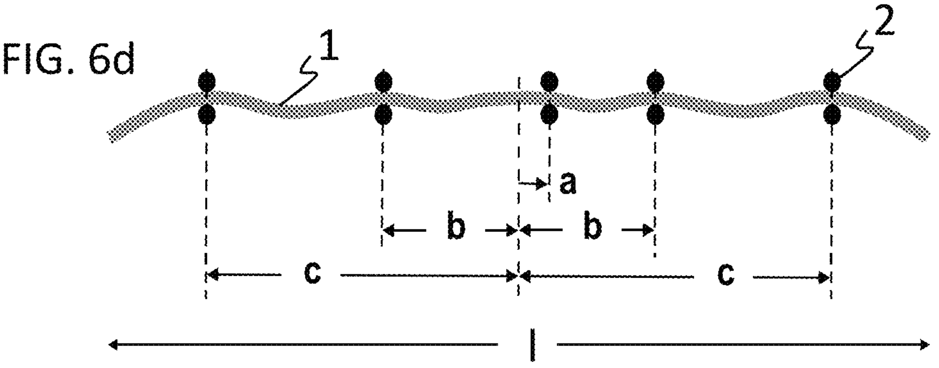

Furthermore, as shown in FIG. 6*d*, if five spacer positions are distributed, then these can be characterized by distances a, b, and c, a being a first distance a between the half-length of the tubular and/or rod-shaped articles and at least one first spacer position of at the least one thread-like element, b being a second distance b between the half-length of the tubular and/or rod-shaped articles and at least one second spacer position of the at least one thread-like element, and c a third distance c between the half-length of the tubular and/or rod-shaped articles and at least one third spacer position of at the least one thread-like element, with a being smaller than b and b being smaller than c. Distances a, b and c are chosen according to the following table:

| $n_t$ | a | b | c |
|---|---|---|---|
| 2 | $0.25 \le a/L \le 0.29$ | | |
| 3 | $-0.015 \le a/L \le 0.015$ | $0.32 \le b/L \le 0.40$ | |
| 4 | $0.10 \le a/L \le 0.16$ | $0.36 \le b/L \le 0.43$ | |
| 5 | $-0.025 \le a/L \le 0.025$ | $0.18 \le b/L \le 0.24$ | $0.38 \le c/L \le 0.44$ |

Figure 7:
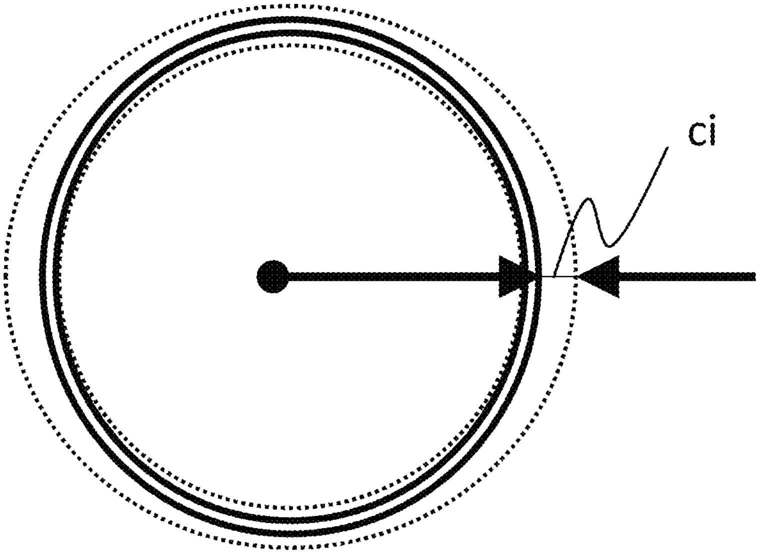
FIG. 7 is a schematic illustration of the measurement method for determination of the circularity error.

FIG. 7 shows schematically the determination of the circularity error, here denoted as ci. The circularity error ci, in this case, is a measure for the deviation of a given shape from the ideal circular shape, Here, a circumferential line of a cross section has to lie in a plane defined by two concentrical circles (that are depicted in FIG. 7 with dotted lines) with a specific, predefined distance from each other. The actual value of the circularity error ci is one half of the maximum difference the outer diameters in the respective plane. In actual practice, instead of the circularity error, the ovality may be given, the ovality being the difference of the maximum outer cross section and the minimum outer cross section in a direction perpendicular to the length l of a rod-shaped or tubular glass article. The ovality is two times the value of the circularity error.

Figure 8:
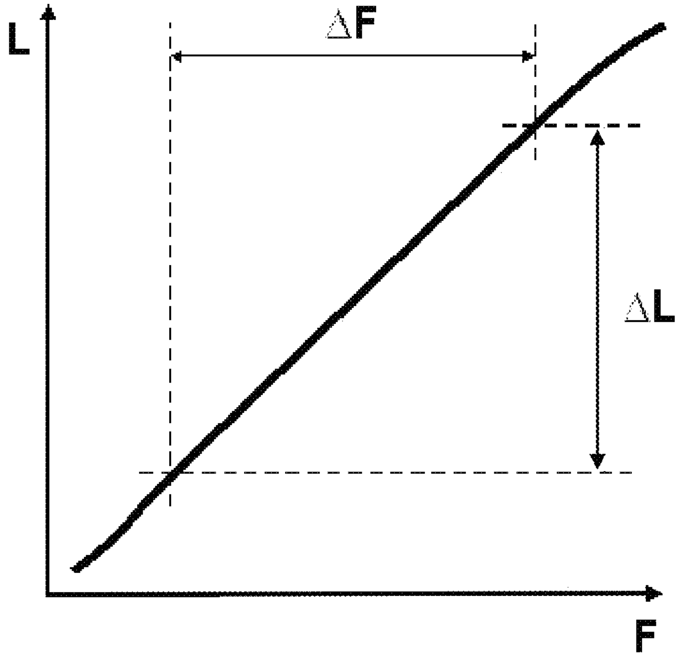
FIG. 8 is a schematic diagram as illustration for the determination of the tensile elasticity.

In FIG. 8, a schematic diagram for determination of the tensile elasticity is shown.

It is reminded that $C_C$, the tensile elasticity, is given according to the following equation:

$$C_S = L \cdot \frac{\Delta F}{\Delta L},$$

wherein L corresponds to the initial length of the thread-like-element (plotted along the y-axis), ΔL is the amount by which the length of the thread-like element changes, and ΔF is the change of the tensile force in the thread-like element, as determined in usual load-strain-curves as shown in the schematic diagram of FIG. 6, that is, by the ratio of the strain (or relative elongation of the respective thread-like element ΔL/L) and the change of the tensile strength, ΔF, in the respective thread-like element.

FIGS. 9 to 13 show diagrams of pulling forces obtained for thread-like elements 2 in bundles 10 according to embodiments of the present disclosure. In all bundles, thread-like elements arranged at a spacer position had been wrapped around the glass articles at least partially in order to space the glass articles apart. Further, the thread-like elements had been wrapped around the glass articles at least partially, forming several knots. These knots were, for each bundle, formed as releasable knots, that is, knots that could easily be untied by pulling one free end of one thread-like element forming the bundle. Furthermore, in all cases, bundles were arranged in a horizontal position. In each of FIGS. 9 to 13, the pulling force (or tension), given in N, has been plotted over the position of the puller used for withdrawal of the at least one thread-like element. Puller position is given in arbitrary units. In each of the diagrams, measurement was conducted for four different layers of glass articles. The number of knots, in each of the examples used for measurement, corresponded to the number of glass articles in a layer. Maximum values correspond to untying of the knot and, thus, to the maximum adhesive force of the knot. Therefore, the maximum measured value corresponds to the minimum value of tension needed for untying of a knot.

In between the maxima, measured tension values correspond to those stages of unpacking wherein simple withdrawal of the thread-like element takes place. In consequence, as no adhesive force of a knot needs to be overcome, much less tension is needed in these stages.

As can be seen in the five diagrams depicting measured tension values needed for withdrawal and untying of knots in bundles of glass articles with different cross sections, minimum pulling forces required depend upon the cross section of the bundled glass articles.

Figure 9:
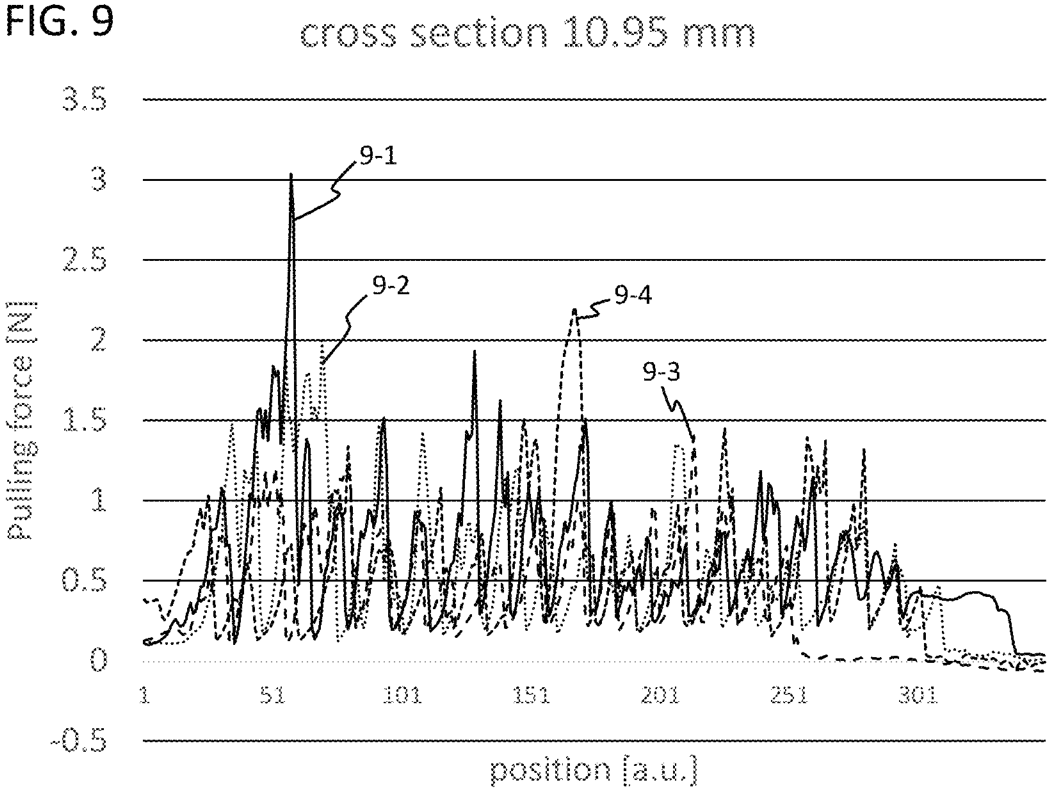
FIGS. 9 to 13 are diagrams depicting pulling forces measured for pulling and withdrawing of thread-like elements comprised by bundles according to embodiments of the disclosure.

FIG. 9 is a diagram depicting pulling forces measured in bundles of tubular and/or rod-shaped glass articles with cross sections of 10.95 mm, indicated as data sets 9-1, 9-2, 9-3 and 9-4. The statistical nature of minimum pulling force or maximum adhesive force of a knot can clearly be seen, as peak values obtained during measurement may range from a value of slightly more than 3 N (data set 9-1, first peak value) to less than 1.5 N or even less (data set 9-3), with an average value of about 2.2 N.

Figure 10:
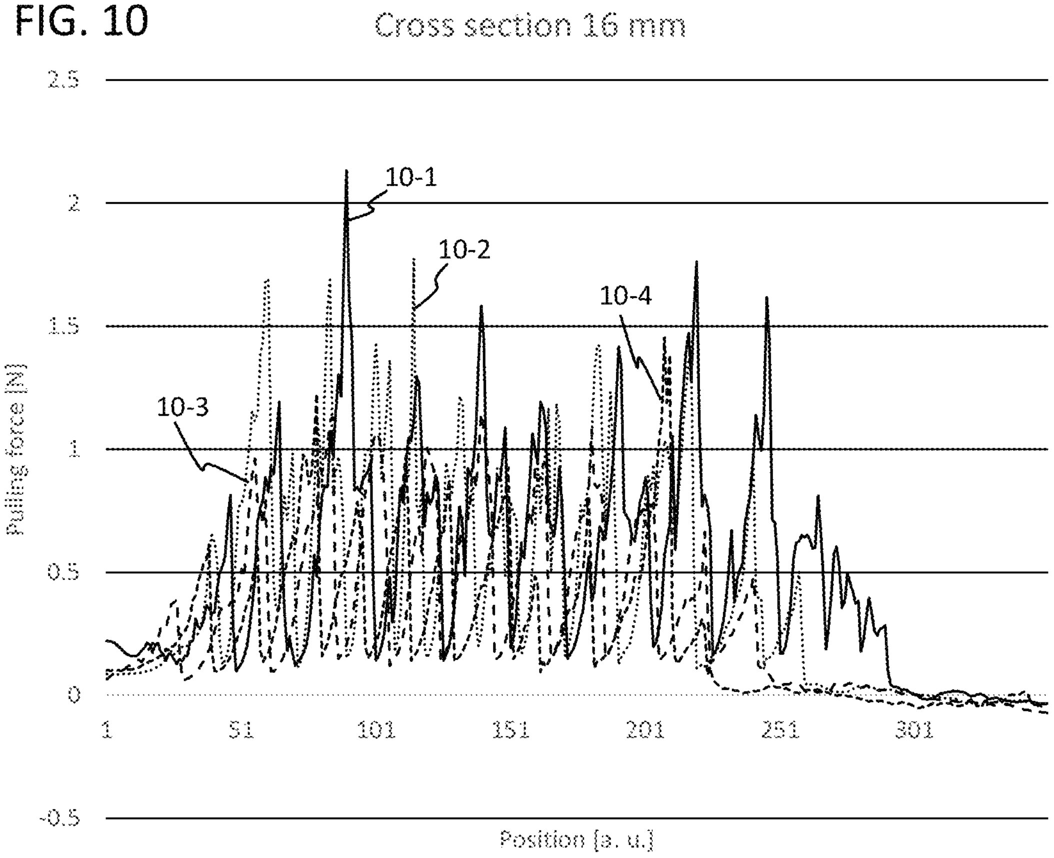

FIG. 10 depicts pulling force over puller position for bundles of tubular and/or rod-shaped glass articles with a cross section of about 16 mm, indicated as data sets 10-1, 10-2, 10-3 and 10-4. Minimum pulling forces ranged from 1.1 N or even less (data set 10-3) to a value of 2.13 N (data set 10.1), with an average of about 1.6 N.

Figure 11:
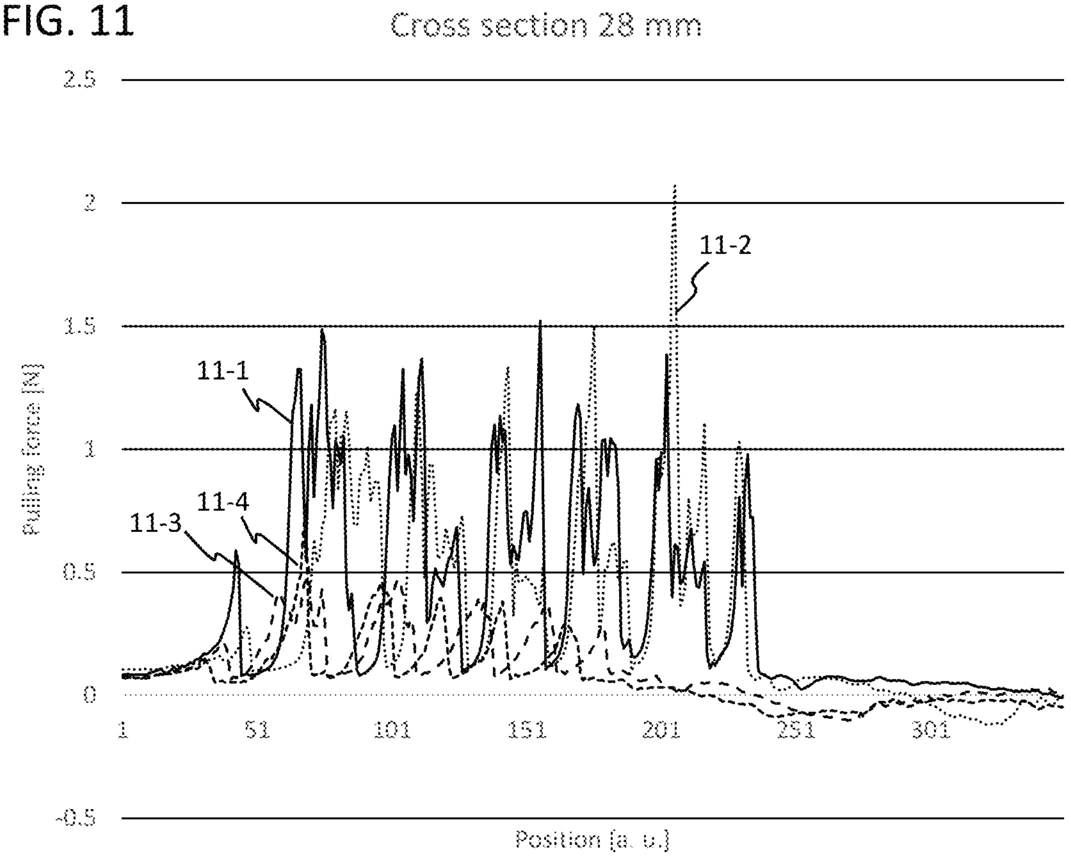

In FIG. 11, for data sets 11-1, 11-2, 11-3 and 11-4, obtained for a cross section of the bundled tubular and/or rod-shaped glass articles of 28 mm, the maximum measured pulling force value (corresponding to the minimum pulling force or, in the alternative, to the maximum adhesive force of the knot) was about 2.1 N (set 11-2), whereas very low values were obtained in set 11-3, corresponding to about 0.5 N. The average "minimum pulling force" amounted to about 1.2 N.

Figure 12:
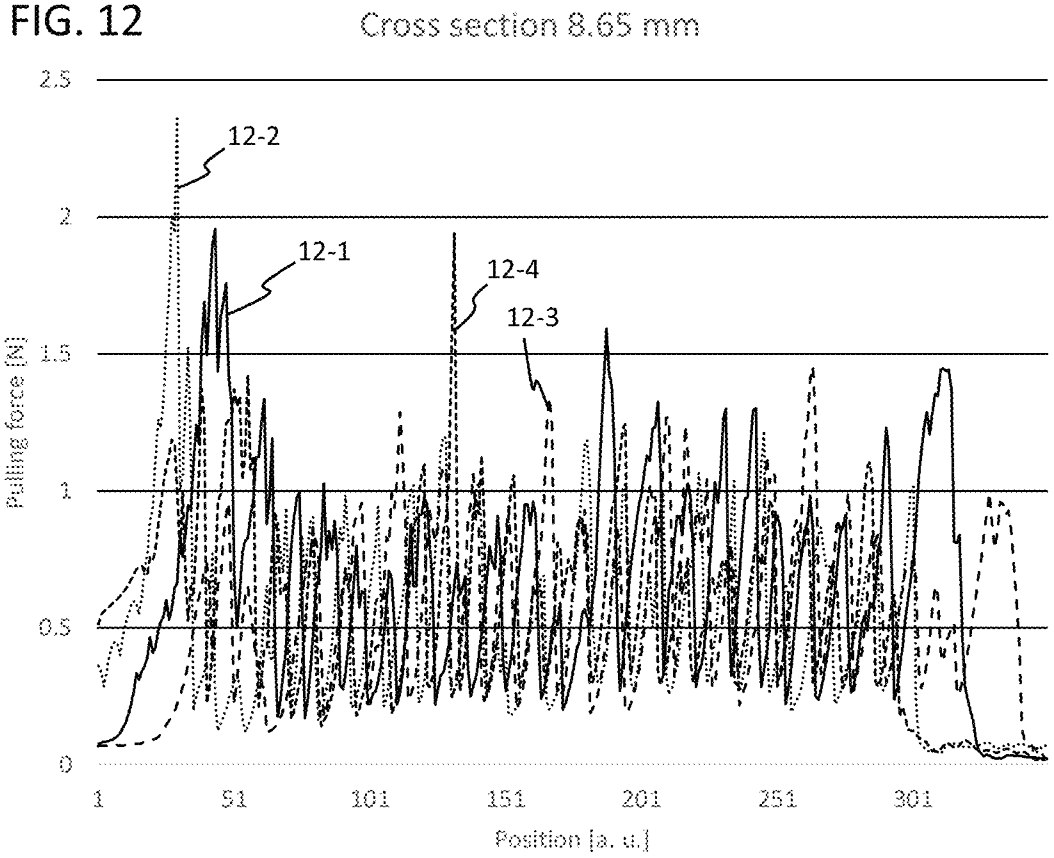

FIG. 12, depicting data sets 12-1, 12-2, 12-3 and 12-4, for cross sections of glass articles of about 8.65 mm, shows a peak value of the pulling force of about 2.4 N (data set 12-2), whereas for some knots, a pulling force as low as 1.4 N (12-3) or even less proved sufficient for releasing tied knots. Average "minimum pulling force" amounted to about 2 N.

Figure 13:
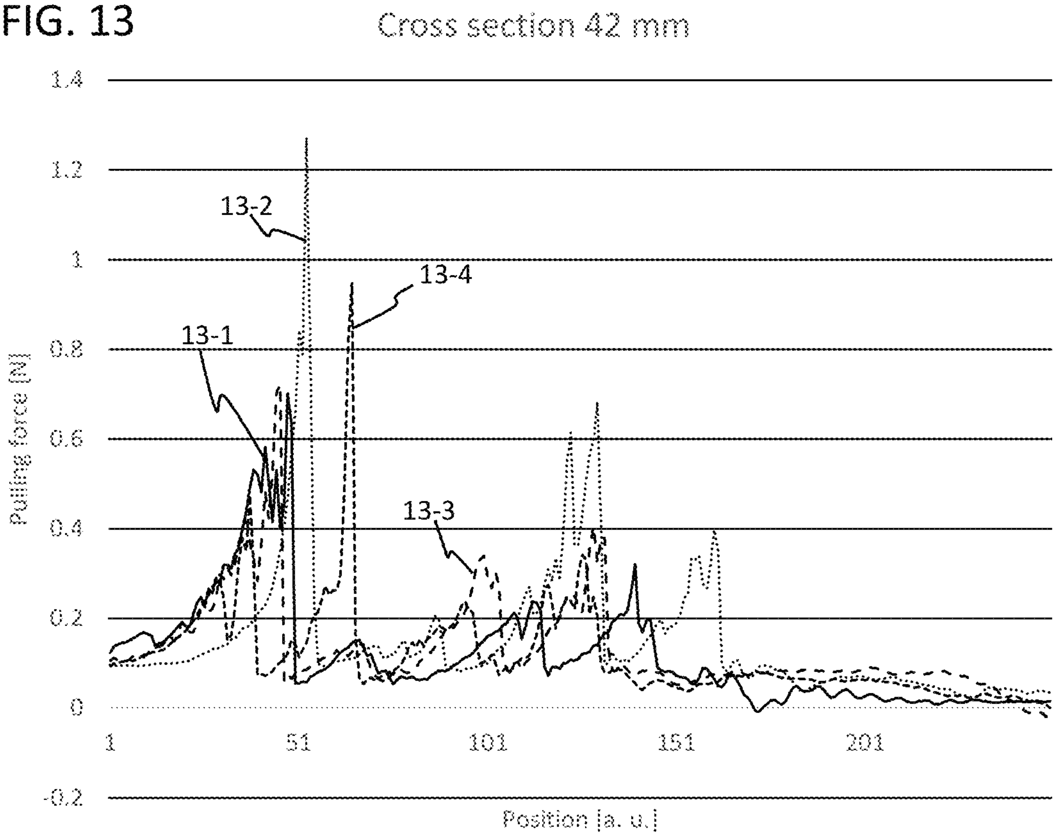

Finally, FIG. 13 depicts data sets 13-1, 13-2, 13-3 and 13-4, for cross sections of bundled glass articles of about 42 mm. A peak value of 1.3 N was obtained for set 13-2, whereas pulling forces for releasing knots could also be as low as 0.7 N (set 13-1) or lesser still, for example 0.4 N (set 13-2). Average was about 0.9 N.

As can be seen, the force required for untying a knot differs and in general is lower the larger the cross section of the bundled articles. However, for smaller cross sections, that is, for cross sections less than about 12 or 11 mm, there seems to be a plateau or "pedestal" section, with minimum pulling forces varying about an average value of about 1.9-2.3 N.

REFERENCE NUMERALS

1 tubular and/or rod-shaped glass article
11 rod-shaped glass article
12 tubular glass article
10 bundle
2 thread-like element
9-1, 9-2, 9-3, 9-4 data sets for pulling forces for glass article cross sections of 10.95 mm
10-1, 10-2, 10-3, 10-4 data sets for pulling forces for glass article cross sections of 16 mm
11-1, 11-2, 11-3, 11-4 data sets for pulling forces for glass article cross sections of 28 mm
12-1, 12-2, 12-3, 12-4 data sets for pulling forces for glass article cross sections of 8.65 mm
13-1, 13-2, 13-3, 13-4 data sets for pulling forces for glass article cross sections of 42 mm
a, b, c distances
l length of the glass article
$d_o$ outer dimension of cross section, diameter of a rod, outer diameter of a tube
$d_i$ inner dimension of tubular cross section
$t_w$ wall thickness
ci circularity error

What is claimed is:

1. A method for unpacking a bundle of tubular and/or rod-shaped glass articles, comprising:

holding the bundle in a locked position; and pulling a thread-like element that is wrapped around at least two of the glass articles so that the thread-like element is withdrawn from the bundle, wherein the thread-like element has a minimum cross section ($c_r$), wherein the thread-like element is wrapped around the glass articles at a plurality of different spaced positions ($n_t$) along the length of the glass articles, wherein the plurality of different spaced positions and the minimum cross section are selected according to:

| | $C_R$ - value | | | |
|---|---|---|---|---|
| $N_L$ | Less than 3000 | 6000 . . . 12000 | 12000 . . . 20000 | More than 20000 |
| Less than 8 | $n_t \geq 2$, $c_t \geq 0.5$ mm | $n_t \geq 2$, $c_t \geq 0.5$ mm | $n_t \geq 3$, $c_t \geq 0.9$ mm | $n_t \geq 4$, $c_t \geq 1.0$ mm |
| 8 to 12 | $n_t \geq 2$, $c_t \geq 0.6$ mm | $n_t \geq 2$, $c_t \geq 0.6$ mm | $n_t \geq 3$, $c_t \geq 1.0$ mm | $n_t \geq 4$, $c_t \geq 1.1$ mm |
| More than 12 | $n_t \geq 3$, $c_t \geq 0.7$ mm | $n_t \geq 3$, $c_t \geq 0.7$ mm | $n_t \geq 3$, $c_t \geq 1.1$ mm | $n_t \geq 4$, $c_t \geq 1.2$ mm |

wherein the $C_R$-value corresponds to:

$$C_R = \frac{l^2}{d_o^2 + 2t_w^2 - 2d_o \cdot t_w}$$

wherein l corresponds to the length of the glass articles in mm, wherein $d_o$ corresponds to an outer diameter of the glass articles in mm, wherein $t_w$ corresponds to a wall thickness of the glass articles in mm, the wall thickness of a rod-shaped article being equal to one half of the outer diameter, wherein the plurality of different spaced positions and the minimum cross section are selected according to:

| | $C_R$ - value | | | |
|---|---|---|---|---|
| $N_L$ | Less than 3000 | 6000 . . . 12000 | 12000 . . . 20000 | More than 20000 |
| Less than 8 | $c_t \geq 0.9$ mm | $c_t \geq 0.9$ mm | $c_t \geq 1.2$ mm | $c_t \geq 1.5$ mm |
| 8 to 12 | $c_t \geq 1.0$ mm | $c_t \geq 1.0$ mm | $c_t \geq 1.3$ mm | $c_t \geq 1.6$ mm |
| More than 12 | $c_t \geq 1.1$ | $c_t \geq 1.1$ mm | $c_t \geq 1.4$ mm | $c_t \geq 1.7$ mm. |

2. The method of claim 1, wherein the plurality of different spaced positions and the minimum cross section are selected according to:

| | $C_R$ - value | | | |
|---|---|---|---|---|
| $N_L$ | Less than 3000 | 6000 . . . 12000 | 12000 . . . 20000 | More than 20000 |
| Less than 8 | $n_t \geq 2$ | $n_t \geq 3$ | $n_t \geq 4$ | $n_t \geq 5$ |
| 8 to 12 | $n_t \geq 2$ | $n_t \geq 3$ | $n_t \geq 4$ | $n_t \geq 5$ |
| More than 12 | $n_t \geq 3$ | $n_t \geq 3$ | $n_t \geq 4$ | $n_t \geq 5$. |

3. The method of claim 1, wherein unpacking a bundle of tubular and/or rod-shaped glass articles the step of pulling the thread-like element comprises applying a pulling force or tension in an axial direction that is between 0.1 N and 4 N.

4. The method of claim 1, wherein the step of holding the bundle comprises applying a supplemental normal force on the bundle that is not greater than 100 N.

5. The method of claim 1, wherein the bundle has a bending stiffness of at least $5*10^9$ $Nmm^2$ and at most $25*10^{11}$ $Nmm^2$.

6. The method of claim 1, wherein the thread-like element has a cross section between at least 0.25 mm and at most 4.0 mm.

7. The method of claim 1, wherein the thread-like element has a tensile elasticity ($C_S$) at least 80 N to at most 700 N, and wherein the tensile elasticity ($C_S$,) is defined by the following equation:

$$C_S = L \cdot \frac{\Delta F}{\Delta L}$$

wherein L corresponds to an initial length of the thread-like-element, ΔL is an amount by which a length of the thread-like element changes, and ΔF is a change of tensile force in the thread-like element.

8. The method of claim 1, wherein the thread-like element is fastened to form a knot with an adhesive force between about 0.1 and 4.0 N.

9. The method of claim 1, wherein the thread-like element is wrapped partially around the two of the glass articles so as to at least partially surrounding the two glass articles.

10. The method of claim 1, wherein the plurality of different spaced positions ($n_t$) are positioned so that a first distance (a) is between a half-length of the glass articles and a first spacer position, a second distance (b) is between the half-length and a second spacer position, and a third distance (c) is between the half-length and a third spacer position, wherein (a) is smaller than (b), and wherein (b) is smaller than (c), and wherein (a), (b), and (c) are chosen according to:

| $n_t$ | (a) | (b) | (c) |
|---|---|---|---|
| 2 | $0.25 \leq a/L \leq 0.29$ | | |
| 3 | $-0.015 \leq a/L \leq 0.015$ | $0.32 \leq b/L \leq 0.40$ | |
| 4 | $0.10 \leq a/L \leq 0.16$ | $0.36 \leq b/L \leq 0.43$ | |
| 5 | $-0.025 \leq a/L \leq 0.025$ | $0.18 \leq b/L \leq 0.24$ | $0.38 \leq c/L \leq 0.44$. |

11. The method of claim 10, further comprising wrapping film radially around the glass articles.

12. The method of claim 11, wherein the film surrounds the glass articles at a position selected from a group consisting of: at least at one of the first, second, and third spacer positions; over an entirety of the length of the glass articles; only at a middle portion of the length of the glass articles; only at one or more end portions of the glass articles; only at each of the first, second, and third spacer positions; and combinations thereof.

13. The method of claim 12, wherein the film is a heat-shrink film.

14. The method of claim 1, wherein the thread-like element comprises a plurality of thread-like elements so that that at each of the plurality of different spaced positions ($n_t$) there is a different one of the plurality of thread-like elements.

15. The method of claim 1, wherein the thread-like element comprises a plastic material selected from a group consisting of polypropylene (PP), polyethylene (PE), high-density polyethylene (HDPE), polyethylene wax, polyamide (PA), styrene-acrylonitrile resin (SAN), polyester polyethylene terephthatalate (PET), polybutylene terephthalate (PBT), polyurethane (PU), polycarbonate (PC), acrylonitrile butadiene styrene (ABS), polyether ether ketone (PEEK), and any combinations thereof.

16. The method of claim 1, wherein the thread-like element comprises a material with a Young's modulus between of at least 500 MPa and of at most 1000 MPa.

17. The method of claim 1, wherein the two glass articles are spaced apart by a distance of at least 0.5 mm.

18. The method of claim 1, further comprising a pallet having the plurality of layers thereon.

19. A method for bundling tubular and/or rod-shaped glass articles to obtain a bundle, comprising:

wrapping a thread-like element around at least two of the glass articles in at least two spaced positions to form a first layer of spaced apart glass articles;

wrapping another thread-like element around at least two more of the glass articles in at least two spaced positions to form a second layer of spaced apart glass articles; and stacking the first and second layers of spaced apart glass articles, wherein the thread-like element has a minimum cross section ($c_r$), wherein the thread-like element is wrapped around the glass articles at a plurality of different spaced positions ($n_t$) along the length of the glass articles, wherein the plurality of different spaced positions and the minimum cross section are selected according to:

| | $C_R$ - value | | | |
|---|---|---|---|---|
| $N_L$ | Less than 3000 | 6000 . . . 12000 | 12000 . . . 20000 | More than 20000 |
| Less than 8 | $n_t \geq 2$, $c_t \geq 0.5$ mm | $n_t \geq 2$, $c_t \geq 0.5$ mm | $n_t \geq 3$, $c_t \geq 0.9$ mm | $n_t \geq 4$, $c_t \geq 1.0$ mm |
| 8 to 12 | $n_t \geq 2$, $c_t \geq 0.6$ mm | $n_t \geq 2$, $c_t \geq 0.6$ mm | $n_t \geq 3$, $c_t \geq 1.0$ mm | $n_t \geq 4$, $c_t \geq 1.1$ mm |
| More than 12 | $n_t \geq 3$, $c_t \geq 0.7$ mm | $n_t \geq 3$, $c_t \geq 0.7$ mm | $n_t \geq 3$, $c_t \geq 1.1$ mm | $n_t \geq 4$, $c_t \geq 1.2$ mm |

wherein the $C_R$-value corresponds to:

$$C_R = \frac{l^2}{d_o^2 + 2t_w^2 - 2d_o \cdot t_w}$$

wherein l corresponds to the length of the glass articles in mm, wherein $d_o$ corresponds to an outer diameter of the glass articles in mm, wherein $t_w$ corresponds to a wall thickness of the glass articles in mm, the wall thickness of a rod-shaped article being equal to one half of the outer diameter, wherein the plurality of different spaced positions and the minimum cross section are selected according to:

| | $C_R$ - value | | | |
|---|---|---|---|---|
| $N_L$ | Less than 3000 | 6000 . . . 12000 | 12000 . . . 20000 | More than 20000 |
| Less than 8 | $c_t \geq 0.9$ mm | $c_t \geq 0.9$ mm | $c_t \geq 1.2$ mm | $c_t \geq 1.5$ mm |
| 8 to 12 | $c_t \geq 1.0$ mm | $c_t \geq 1.0$ mm | $c_t \geq 1.3$ mm | $c_t \geq 1.6$ mm |
| More than 12 | $c_t \geq 1.1$ | $c_t \geq 1.1$ mm | $c_t \geq 1.4$ mm | $c_t \geq 1.7$ mm. |

20. The method of claim 19, wherein the plurality of different spaced positions and the minimum cross section are selected according to:

| | $C_R$ - value | | | |
|---|---|---|---|---|
| $N_L$ | Less than 3000 | 6000 . . . 12000 | 12000 . . . 20000 | More than 20000 |
| Less than 8 | $n_t \geq 2$ | $n_t \geq 3$ | $n_t \geq 4$ | $n_t \geq 5$ |
| 8 to 12 | $n_t \geq 2$ | $n_t \geq 3$ | $n_t \geq 4$ | $n_t \geq 5$ |
| More than 12 | $n_t \geq 3$ | $n_t \geq 3$ | $n_t \geq 4$ | $n_t \geq 5$. |

21. The method of claim 19, wherein a step of pulling the thread-like element when unpacking the bundle of tubular and/or rod-shaped glass articles comprises applying a pulling force or tension in an axial direction that is between 0.1 N and 4 N and/or wherein the step of holding the bundle comprises applying a supplemental normal force on the bundle that is not greater than 100 N.

22. The method of claim 19, wherein the thread-like element is wrapped partially around the two of the glass articles so as to at least partially surrounding the two glass articles.

* * * * *